(12) United States Patent
Liu et al.

(10) Patent No.: US 11,212,690 B2
(45) Date of Patent: Dec. 28, 2021

(54) INTER-FREQUENCY/INTER-SYSTEM MEASUREMENT METHOD, TERMINAL DEVICE, AND NETWORK DEVICE

(71) Applicant: SHENZHEN HEYTAP TECHNOLOGY CORP., LTD., Guangdong (CN)

(72) Inventors: Jianhua Liu, Dongguan (CN); Ning Yang, Dongguan (CN)

(73) Assignee: SHENZHEN HEYTAP TECHNOLOGY CORP., LTD., Guangdong (CN)

( * ) Notice: Subject to any disclaimer, the term of this patent is extended or adjusted under 35 U.S.C. 154(b) by 0 days.

(21) Appl. No.: 16/624,869

(22) PCT Filed: Jul. 18, 2017

(86) PCT No.: PCT/CN2017/093360
§ 371 (c)(1),
(2) Date: Dec. 19, 2019

(87) PCT Pub. No.: WO2019/014850
PCT Pub. Date: Jan. 24, 2019

(65) Prior Publication Data
US 2020/0137605 A1    Apr. 30, 2020

(51) Int. Cl.
*H04W 24/10*    (2009.01)
(52) U.S. Cl.
CPC .................... *H04W 24/10* (2013.01)
(58) Field of Classification Search
None
See application file for complete search history.

(56) References Cited

U.S. PATENT DOCUMENTS

2012/0263054 A1  10/2012  Muhammad
2014/0362716 A1* 12/2014  Zhang .............. H04W 36/0088
                                                370/252
(Continued)

FOREIGN PATENT DOCUMENTS

CN    102036273 A    4/2011
CN    102300202 A   12/2011
(Continued)

OTHER PUBLICATIONS

3GPP TS 36.300 V14.2.0 (Mar. 2017), "Evolved Universal Terrestrial Radio Access (E-UTRA) and Evolved Universal Terrestrial Radio Access Network (E-UTRAN)", Overall description, Stage 2 (Release 14).

(Continued)

*Primary Examiner* — Chi H Pham
*Assistant Examiner* — Raul Rivas
(74) *Attorney, Agent, or Firm* — Ladas & Parry, LLP

(57) ABSTRACT

Disclosed in embodiments of the application are an inter-frequency/inter-system measurement method, a terminal device, and a network device. The method comprises: a terminal device sends, to a network device, auxiliary information for determining a target measurement gap mode; the terminal device receives indication information sent by the network device, the indication information being used for indicating the target measurement gap mode; and the terminal device performs inter-frequency/inter-system measurement according to the target measurement gap mode. In the method, terminal device and network device in the embodiments of the present application, the terminal device sends some auxiliary information to the network device, so that the network device can better understand the performance of the terminal device and then configures a proper measurement gap mode, which facilitates to improve the accuracy of a (Continued)

700 — A terminal device determines a target measurement gap mode in multiple measurement gap modes — 710

The terminal device sends to a network device indication information used for indicating the target measurement gap mode — 720

The terminal device performs inter-frequency/inter-system measurement according to the target measurement gap mode — 720 measurement report, thereby improving the performance of a system.

20 Claims, 7 Drawing Sheets

(56) References Cited

U.S. PATENT DOCUMENTS

| | | |
|---|---|---|
| 2015/0245235 A1 | 8/2015 | Yang |
| 2016/0192339 A1 | 6/2016 | Axmon et al. |
| 2016/0248533 A1 | 8/2016 | Li et al. |

FOREIGN PATENT DOCUMENTS

| | | |
|---|---|---|
| CN | 103546918 A | 1/2014 |
| EP | 3065443 A1 | 9/2016 |
| KR | 20160101127 A | 8/2016 |
| WO | 2016184217 A1 | 11/2016 |

OTHER PUBLICATIONS

3GPP TS 36.331 V13.0.0 (Dec. 2015), "Evolved Universal Terrestrial Radio Access (E-UTRA)", Radio Resource Control (RRC), Protocol specification (Release 13).

Supplementary European Search Report in the European application No. 17917959.3, dated Dec. 16, 2020.
Supplementary European Search Report in the European application No. 17917959.3, dated Mar. 18, 2020.
English translation of the Written Opinion of the International Search Authority in the international application No. PCT/CN2017/093360, dated Mar. 30, 2018.
International Search Report in the international application No. PCT/CN2017/093360, dated Mar. 30, 2018.
Written Opinion of the International Search Authority in the international application No. PCT/CN2017/093360, dated Mar. 30, 2018 and English translation provided by Google Translate.
Alcatel-Lucent et al., "3GPP TSG RAN WG2 Meeting #81 bis R2-131058", NW Based Solutions for Pico Cell Discovery with UE Assistance in HetNets, Apr. 19, 2013 (Apr. 19, 2013), sections 2.4 and 2.5.1.
Second Office Action of the European application No. 17917959.3, dated May 31, 2021.
Office Action of the Indian application No. 201917053563, dated Apr. 29, 2021.
First Office Action of the Korean application No. 10-2019-7036102, dated Mar. 19, 2021.
Notice of Final Rejection of the Korean application No. 10-2019-7036102, dated Sep. 23, 2021.
Notice of Rejection after re-examination of the Korean application No. 10-2019-7036102, dated Nov. 8, 2021.

* cited by examiner

INTER-FREQUENCY/INTER-SYSTEM MEASUREMENT METHOD, TERMINAL DEVICE, AND NETWORK DEVICE

CROSS-REFERENCE TO RELATED APPLICATION

The application is a U.S. national phase application of International Patent Application No. PCT/CN2017/093360, filed on Jul. 18, 2017, the content of which is hereby incorporated by reference in its entirety.

TECHNICAL FIELD

Embodiments of the disclosure relate to the field of communication, and more particularly to an inter-frequency/inter-system measurement method, a terminal device and a network device.

BACKGROUND

Under an inter-frequency networking condition, if a mobile terminal moves between inter-frequency cells, it is required to measure the inter-frequency cells to acquire signal quality of the inter-frequency cells. User Equipment (UE) usually performs measurement in a measurement gap only. A mode of the measurement gap (GAP) is fixedly configured by a network device, which may cause a problem of poor system performance, for example, the measurement accuracy is low.

SUMMARY

In view of this, the embodiments of the disclosure provide an inter-frequency/inter-system measurement method, a terminal device and a network device, which facilitates to improve system performance.

A first aspect provides an inter-frequency/inter-system measurement method, which may include the following operations. A terminal device sends to a network device auxiliary information for determining a target measurement gap mode. The terminal device receives indication information sent by the network device, the indication information being used for indicating the target measurement gap mode. The terminal device performs inter-frequency/inter-system measurement according to the target measurement gap mode.

The auxiliary information may be some specific information assisting in determination of the measurement gap mode, for example, movement speed information of the terminal device or some transmission characteristics of a present service of the terminal device. Or, the auxiliary information may also be a measurement gap mode that the terminal device suggested to the network device as a reference for the network device.

The terminal device sends some auxiliary information to the network device, so that the network device to better understand performance of the terminal device and further configure a suitable measurement gap mode, which facilitates to enhance accuracy of a measurement report, thereby improving system performance.

In a possible implementation mode, the auxiliary information may be a desired measurement gap mode of the terminal device or an increment value of a gap period of the desired measurement gap mode of the terminal device relative to a gap period of a measurement gap mode previously configured by the network device, and the method may further include that: the terminal device determines the desired measurement gap mode in multiple measurement gap modes.

In at least one embodiment, the network device and the terminal device may predetermine the multiple measurement gap modes, or the network device may also configure the multiple measurement gap modes for the terminal device in advance. The multiple measurement gap modes may include a mode 1 and mode 2 in a Long Term Evolution (LTE) system, and may also be some other modes. Predetermination refers to determination according to a protocol, i.e., a default factory configuration of the terminal device.

The terminal device pre-stores the multiple measurement gap modes, and the terminal device selects and notifies the desired measurement gap mode to the network device to enable the network device to match a suitable measurement gap mode for the terminal device better in combination with the performance of the terminal.

In a possible implementation mode, the operation that the terminal device determines the desired measurement gap mode in the multiple measurement gap modes may include the following action. The terminal device determines the desired measurement gap mode in the multiple measurement gap modes according to at least one of the following information: movement speed information of the terminal device, Quality of Service (QoS) information of a present service of the terminal device, QoS information of a detected service of the terminal device or present channel quality information of the terminal device.

In a possible implementation mode, the operation that the terminal device determines the desired measurement gap mode in the multiple measurement gap modes according to the movement speed information of the terminal device may include the following actions. When a movement speed of the terminal device is greater than or equal to a first threshold, the terminal device determines a first measurement gap mode in the multiple measurement gap modes as the desired measurement gap mode. When the movement speed of the terminal device is less than the first threshold, the terminal device determines a second measurement gap mode in the multiple measurement gap modes as the desired measurement gap mode. A gap period of the first measurement gap mode is less than a gap period of the second measurement gap mode.

In at least one embodiment, besides the movement speed of the terminal device, a movement acceleration of the terminal device may also be adopted.

In a possible implementation mode, the operation that the terminal device determines the desired measurement gap mode in the multiple measurement gap modes according to the QoS information of the present service of the terminal device may include the following actions. When a service delay requirement in the QoS information of the present service is greater than or equal to a second threshold, the terminal device determines a third measurement gap mode in the multiple measurement gap modes as the desired measurement gap mode. When the service delay requirement in the QoS information of the present service is less than the second threshold, the terminal device determines a fourth measurement gap mode in the multiple measurement gap modes as the desired measurement gap mode. A gap period of the third measurement gap mode is greater than a gap period of the fourth measurement gap mode.

In a possible implementation mode, the operation that the terminal device determines the desired measurement gap mode in the multiple measurement gap modes according to the QoS information of the present service of the terminal device may include the following actions. When a data rate requirement in the QoS information of the present service is greater than or equal to a third threshold, the terminal device determines a fifth measurement gap mode in the multiple measurement gap modes as the desired measurement gap mode. When the data rate requirement in the QoS information of the present service is less than the third threshold, the terminal device determines a sixth measurement gap mode in the multiple measurement gap modes as the desired measurement gap mode. A gap period of the fifth measurement gap mode is less than a gap period of the sixth measurement gap mode.

In a possible implementation mode, the operation that the terminal device determines the desired measurement gap mode in the multiple measurement gap modes according to the QoS information of the detected service may include the following actions. When a service delay in the QoS information of the detected service is greater than or equal to a fourth threshold, the terminal device determines a seventh measurement gap mode in the multiple measurement gap modes as the desired measurement gap mode. When the service delay in the QoS information of the detected service is less than the fourth threshold, the terminal device determines an eighth measurement gap mode in the multiple measurement gap modes as the desired measurement gap mode. A gap period of the seventh measurement gap mode is greater than a gap period of the eighth measurement gap mode.

In a possible implementation mode, the operation that the terminal device determines the desired measurement gap mode in the multiple measurement gap modes according to the QoS information of the detected service may include the following actions. When a data rate in the QoS information of the detected service is greater than or equal to a fifth threshold, the terminal device determines a ninth measurement gap mode in the multiple measurement gap modes as the desired measurement gap mode. When the data rate in the QoS information of the detected service is less than the fifth threshold, the terminal device determines a tenth measurement gap mode in the multiple measurement gap modes as the desired measurement gap mode. A gap period of the ninth measurement gap mode is less than a gap period of the tenth measurement gap mode. In at least one embodiment, a QoS parameter includes an end-to-end delay, jitter, a data rate, a packet loss rate, a network throughput, data transmission reliability and the like. Different rules may be configured for each QoS parameter to determine the desired measurement gap mode of the terminal device.

In a possible implementation mode, the operation that the terminal device determines the desired measurement gap mode in the multiple measurement gap modes according to the present channel quality information of the terminal device may include the following actions. When present channel quality of the terminal device is lower than a sixth threshold, the terminal device determines an eleventh measurement gap mode in the multiple measurement gap modes as the desired measurement gap mode. When the present channel quality of the terminal device is greater than or equal to the sixth threshold, the terminal device determines a twelfth measurement gap mode in the multiple measurement gap modes as the desired measurement gap mode. A gap period of the eleventh measurement gap mode is less than a gap period of the twelfth measurement gap mode.

In at least one embodiment, each corresponding relationship and each threshold may be pre-configured by the network device.

In a possible implementation mode, the auxiliary information may include at least one of the following information: the movement speed information of the terminal device, the QoS information of the present service of the terminal device, the QoS information of the detected service of the terminal device or the present channel quality information of the terminal device.

The terminal device may also directly report various auxiliary information to the network device, so that the network device independently configures the measurement gap mode for the terminal device in combination with the auxiliary information without previous configuration by the network device, which facilitates reduction of a network overhead.

In a possible implementation mode, the operation that the terminal device receives the indication information sent by the network device may include that: the terminal device receives the indication information through Radio Resource Control (RRC) signaling.

Other high-layer signaling such as Media Access Control (MAC) signaling may also be adopted.

A second aspect provides an inter-frequency/inter-system measurement method, which may include the following actions. A network device receives auxiliary information for a measurement gap from a terminal device. The network device determines a target measurement gap mode for inter-frequency/inter-system measurement according to the auxiliary information. The network device sends to the terminal device indication information used for indicating the target measurement gap mode.

In a possible implementation mode, the auxiliary information may include at least one of the following information: movement speed information of the terminal device, QoS information of a present service of the terminal device, QoS information of a detected service of the terminal device or present channel quality information of the terminal device.

In a possible implementation mode, the auxiliary information may include the movement speed information of the terminal device, and the operation that the network device determines the target measurement gap mode for inter-frequency/inter-system measurement according to the auxiliary information may include the following actions. When a movement speed of the terminal device is greater than or equal to a first threshold, the network device determines a gap mode of which a gap period is a first period as the target measurement gap mode. If the movement speed of the terminal device is less than the first threshold, the network device determines a gap mode of which a gap period is a second period as the target measurement gap mode. The first period is less than the second period.

In a possible implementation mode, the auxiliary information may include the QoS information of the present service of the terminal device, and the operation that the network device determines the target measurement gap mode for inter-frequency/inter-system measurement according to the auxiliary information may include the following actions. When a service delay in the QoS information of the present service is greater than or equal to a second threshold, the network device determines a gap mode of which a gap period is a third period as the target measurement gap mode. When the service delay in the QoS information of the present service is less than the second threshold, the network device determines a gap mode of which a gap period is a fourth period as the target measurement gap mode. The third period is greater than the fourth period.

In a possible implementation mode, the auxiliary information may include the QoS information of the present service of the terminal device, and the operation that the network device determines the target measurement gap mode for inter-frequency/inter-system measurement according to the auxiliary information may include the following actions. When a data rate requirement in the QoS information of the present service is greater than or equal to a third threshold, the network device determines a gap mode of which a gap period is a fifth period as the target measurement gap mode. When the data rate requirement in the QoS information of the present service is less than the third threshold, the network device determines a gap mode of which a gap period is a sixth period as the target measurement gap mode. The fifth period is less than the sixth period.

In a possible implementation mode, the auxiliary information may include the QoS information of the detected service of the terminal device, and the operation that the network device determines the target measurement gap mode for inter-frequency/inter-system measurement according to the auxiliary information may include the following actions. When a service delay in the QoS information of the detected service is greater than or equal to a fourth threshold, the network device determines a gap mode of which a gap period is a seventh period as the target measurement gap mode. When the service delay in the QoS information of the detected service is less than the fourth threshold, the network device determines a gap mode of which a gap period is an eighth period as the target measurement gap mode. The seventh period is greater than the eighth period.

In a possible implementation mode, the auxiliary information may include the QoS information of the detected service of the terminal device, and the operation that the network device determines the target measurement gap mode for inter-frequency/inter-system measurement according to the auxiliary information may include the following actions. When a data rate in the QoS information of the detected service is greater than or equal to a fifth threshold, the network device determines a gap mode of which a gap period is a ninth period as the target measurement gap mode. When the data rate in the QoS information of the detected service is less than the fifth threshold, the network device determines a gap mode of which a gap period is a tenth period as the target measurement gap mode. The ninth period is greater than the tenth period.

In a possible implementation mode, the auxiliary information may include the present channel quality information of the terminal device, and the operation that the network device determines the target measurement gap mode for inter-frequency/inter-system measurement according to the auxiliary information may include the following actions. When present channel quality of the terminal device is lower than a sixth threshold, the network device determines a gap mode of which a gap period is an eleventh period as the target measurement gap mode. When the present channel quality of the terminal device is greater than or equal to the sixth threshold, the network device determines a gap mode of which a gap period is a twelfth period as the target measurement gap mode. The eleventh period is less than the twelfth period.

In a possible implementation mode, the auxiliary information may be a desired measurement gap mode of the terminal device or an increment value of a gap period of the desired measurement gap mode of the terminal device relative to a gap period of a measurement gap mode previously configured by the network device. The operation that the network device determines the target measurement gap mode for inter-frequency/inter-system measurement according to the auxiliary information may include that: the network device determines the target measurement gap mode according to the desired measurement gap mode of the terminal device or the increment value.

In a possible implementation mode, the operation that the network device sends the indication information configured to indicate the target measurement gap mode to the terminal device may include that: the network device sends the indication information to the terminal device through RRC signaling.

A third aspect provides an inter-frequency/inter-system measurement method, which may include the following operations. A terminal device determines a target measurement gap mode in multiple measurement gap modes. The terminal device sends to a network device indication information used for indicating the target measurement gap mode. The terminal device performs inter-frequency/inter-system measurement according to the target measurement gap mode.

The terminal device independently selects the measurement gap mode for inter-frequency/inter-system measurement from the multiple measurement gap modes, so that a suitable measurement gap mode may be determined better in combination with performance of the terminal device, and system performance is thus improved.

In a possible implementation mode, the operation that the terminal device determines the target measurement gap mode in the multiple measurement gap modes may include the following action. The terminal device determines the target measurement gap mode in the multiple measurement gap modes according to at least one of the following information: movement speed information of the terminal device, QoS information of a present service of the terminal device, QoS information of a detected service of the terminal device or present channel quality information of the terminal device.

The terminal device autonomously selects the measurement gap mode for inter-frequency/inter-system measurement from the multiple measurement gap modes in combination with the performance of the terminal device, so that the system performance can be further improved.

In a possible implementation mode, the operation that the terminal device determines the target measurement gap mode in the multiple measurement gap modes according to the movement speed information of the terminal device may include the following actions. When a movement speed of the terminal device is greater than or equal to a first threshold, the terminal device determines a first measurement gap mode in the multiple measurement gap modes as the target measurement gap mode. When the movement speed of the terminal device is less than the first threshold, the terminal device determines a second measurement gap mode in the multiple measurement gap modes as the target measurement gap mode. A gap period of the first measurement gap mode is less than a gap period of the second measurement gap mode.

In a possible implementation mode, the operation that the terminal device determines the target measurement gap mode in the multiple measurement gap modes according to the QoS information of the present service of the terminal device may include the following actions. When a service delay requirement in the QoS information of the present service is greater than or equal to a second threshold, the terminal device determines a third measurement gap mode in the multiple measurement gap modes as the target measurement gap mode. When the service delay requirement in the QoS information of the present service is less than the second threshold, the terminal device determines a fourth measurement gap mode in the multiple measurement gap modes as the target measurement gap mode. A gap period of the third measurement gap mode is greater than a gap period of the fourth measurement gap mode.

In a possible implementation mode, the operation that the terminal device determines the target measurement gap mode in the multiple measurement gap modes according to the QoS information of the present service of the terminal device may include the following actions. When a data rate requirement in the QoS information of the present service is greater than or equal to a third threshold, the terminal device determines a fifth measurement gap mode in the multiple measurement gap modes as the target measurement gap mode. When the data rate requirement in the QoS information of the present service is less than the third threshold, the terminal device determines a sixth measurement gap mode in the multiple measurement gap modes as the target measurement gap mode. A gap period of the fifth measurement gap mode is less than a gap period of the sixth measurement gap mode.

In a possible implementation mode, the operation that the terminal device determines the target measurement gap mode in the multiple measurement gap modes according to the QoS information of the detected service may include the following actions. When a service delay in the QoS information of the detected service is greater than or equal to a fourth threshold, the terminal device determines a seventh measurement gap mode in the multiple measurement gap modes as the target measurement gap mode. When the service delay in the QoS information of the detected service is less than the fourth threshold, the terminal device determines an eighth measurement gap mode in the multiple measurement gap modes as the target measurement gap mode. A gap period of the seventh measurement gap mode is greater than a gap period of the eighth measurement gap mode.

In a possible implementation mode, the operation that the terminal device determines the target measurement gap mode in the multiple measurement gap modes according to the QoS information of the detected service may include the following actions. When a data rate in the QoS information of the detected service is greater than or equal to a fifth threshold, the terminal device determines a ninth measurement gap mode in the multiple measurement gap modes as the target measurement gap mode. When the data rate in the QoS information of the detected service is less than the fifth threshold, the terminal device determines a tenth measurement gap mode in the multiple measurement gap modes as the target measurement gap mode. A gap period of the ninth measurement gap mode is less than a gap period of the tenth measurement gap mode.

In a possible implementation mode, the operation that the terminal device determines the target measurement gap mode in the multiple measurement gap modes according to the present channel quality information of the terminal device may include the following actions. When present channel quality of the terminal device is lower than a sixth threshold, the terminal device determines an eleventh measurement gap mode in the multiple measurement gap modes as the target measurement gap mode. When the present channel quality of the terminal device is greater than or equal to the sixth threshold, the terminal device determines a twelfth measurement gap mode in the multiple measurement gap modes as the target measurement gap mode. A gap period of the eleventh measurement gap mode is less than a gap period of the twelfth measurement gap mode.

In a possible implementation mode, the multiple measurement gap modes may be pre-configured by the network device or predetermined.

A fourth aspect provides an inter-frequency/inter-system measurement method, which corresponds to the third aspect or any possible implementation mode of the third aspect. The method is executed by a network device by receiving information sent by a terminal device in the third aspect or any implementation mode of the third aspect.

A fifth aspect provides a terminal device, which is configured to execute the method in the first aspect or any possible implementation mode of the first aspect. Specifically, the terminal device includes units configured to execute the method in the first aspect or any possible implementation mode of the first aspect.

A sixth aspect provides a network device, which is configured to execute the method in the second aspect or any possible implementation mode of the second aspect. Specifically, the network device includes units configured to execute the method in the second aspect or any possible implementation mode of the second aspect.

A seventh aspect provides a terminal device, which is configured to execute the method in the third aspect or any possible implementation mode of the third aspect. Specifically, the terminal device includes units configured to execute the method in the third aspect or any possible implementation mode of the third aspect.

An eighth aspect provides a network device, which is configured to execute the method in the fourth aspect or any possible implementation mode of the fourth aspect. Specifically, the network device includes units configured to execute the method in the fourth aspect or any possible implementation mode of the fourth aspect.

A ninth aspect provides a terminal device, which includes a memory, a processor, an input interface and an output interface. The memory, the processor, the input interface and the output interface are connected through a bus system. The memory is configured to store an instruction. The processor is configured to execute the instruction stored in the memory to execute the method in the first aspect or any possible implementation mode of the first aspect.

A tenth aspect provides a network device, which includes a memory, a processor, an input interface and an output interface. The memory, the processor, the input interface and the output interface are connected through a bus system. The memory is configured to store an instruction. The processor is configured to execute the instruction stored in the memory to execute the method in the second aspect or any possible implementation mode of the second aspect.

An eleventh aspect provides a terminal device, which includes a memory, a processor, an input interface and an output interface. The memory, the processor, the input interface and the output interface are connected through a bus system. The memory is configured to store an instruction. The processor is configured to execute the instruction stored in the memory to execute the method in the third aspect or any possible implementation mode of the third aspect.

A twelfth aspect provides a network device, which includes a memory, a processor, an input interface and an output interface. The memory, the processor, the input interface and the output interface are connected through a bus system. The memory is configured to store an instruction. The processor is configured to execute the instruction stored in the memory to execute the method in the fourth aspect or any possible implementation mode of the fourth aspect.

A thirteenth aspect provides a computer storage medium, which is configured to store a computer software instruction for executing the method in the first aspect or any possible implementation mode of the first aspect, or the method in the second aspect or any possible implementation mode of the second aspect, or the method in the third aspect or any possible implementation mode of the third aspect or the method in the fourth aspect or any possible implementation mode of the fourth aspect. The computer software instruction includes a program designed to execute the above aspects.

A fourteenth aspect provides a computer program product including an instruction, where the instruction, when being executed in a computer, causes the computer to execute the method in the first aspect or any optional implementation mode of the first aspect, or the method in the second aspect or any optional implementation mode of the second aspect, or the method in the third aspect or any optional implementation mode of the third aspect or the method in the fourth aspect or any optional implementation mode of the fourth aspect.

It will become clearer and easier to understand for these aspects or other aspects of the disclosure through the following descriptions about the embodiments.

DETAILED DESCRIPTION

Figure 1:
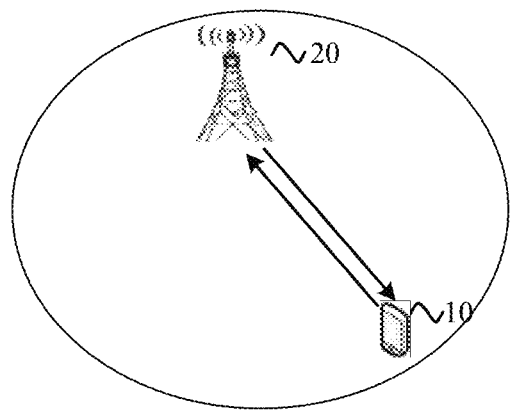
FIG. 1 is a schematic diagram of an application scenario according to an embodiment of the disclosure.

The technical solutions in the embodiments of the disclosure will be clearly and completely described below in combination with the drawings in the embodiments of the disclosure.

It is to be understood that the technical solutions of the embodiments of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), an LTE system, an LTE Frequency Division Duplex (FDD) system, LTE Time Division Duplex (TDD), a Universal Mobile Telecommunication System (UMTS), a Worldwide Interoperability for Microwave Access (WiMAX) communication system, New Radio (NR) or a future 5th-Generation (5G) system.

Particularly, the technical solutions of the embodiments of the disclosure may be applied to various nonorthogonal multiple access technology-based communication systems, for example, a Sparse Code Multiple Access (SCMA) system and a Low Density Signature (LDS) system, and of course, the SCMA system and the LDS system may also have other names in the field of communication. Furthermore, the technical solutions of the embodiments of the disclosure may be applied to multi-carrier transmission systems adopting nonorthogonal multiple access technologies, for example, Orthogonal Frequency Division Multiplexing (OFDM), Filter Bank Multi-Carrier (FBMC), Generalized Frequency Division Multiplexing (GFDM) and Filtered-OFDM (F-OFDM) systems adopting the nonorthogonal multiple access technologies.

In the embodiments of the disclosure, a terminal device may refer to UE, an access terminal, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device or another processing device connected to a wireless modem, a vehicle-mounted device, a wearable device, UE in a future 5G network, UE in a future evolved Public Land Mobile Network (PLMN) or the like. There are no limits made in the embodiments of the disclosure.

In the embodiments of the disclosure, a network device may be a device configured to communicate with the terminal device. The network device may be a Base Transceiver Station (BTS) in the GSM or the CDMA, may also be a NodeB (NB) in the WCDMA system, may also be an Evolutional Node B (eNB or eNodeB) in the LTE system and may further be a wireless controller in a Cloud Radio Access Network (CRAN) scenario. Or the network device may be a relay station, an access point, a vehicle-mounted device, a wearable device, a network device in the future 5G network, a network device in the future evolved PLMN or the like. There are no limits made to the network device in the embodiments of the disclosure.

FIG. 1 is a schematic diagram of an application scenario according to an embodiment of the disclosure. A communication system in FIG. 1 may include a terminal device 10 and a network device 20. The network device 20 is configured to provide communication service for the terminal device 10 and access to a core network. The terminal device 10 searches for a synchronization signal, broadcast signal and the like sent by the network device 20 to access the network, and thus to communicate with the network. Arrows illustrated in FIG. 1 may represent uplink/downlink transmission performed through a cellular link between the terminal device 10 and the network device 20.

Measurement in an LTE system mainly refers to mobility measurement in a connection state. After a network sends a measurement configuration to UE, the UE detects a signal state of a neighboring cell according to parameters such as a measurement object and a report configuration indicated in the measurement configuration. UE usually has only one receiver and may receive a signal at one frequency at the same moment and cannot simultaneously perform measure other frequencies. Therefore, the 3rd Generation Partnership Project (3GPP) proposes a manner of measurement gap, i.e., part of time (i.e., measurement gap time) is reserved. During this time, UE will not send and receive any data and the receiver is set to operate in a frequency of a target cell to perform inter-frequency measurement, and then set back to operate in a frequency of the present cell at the end of the gap time.

Figure 2:
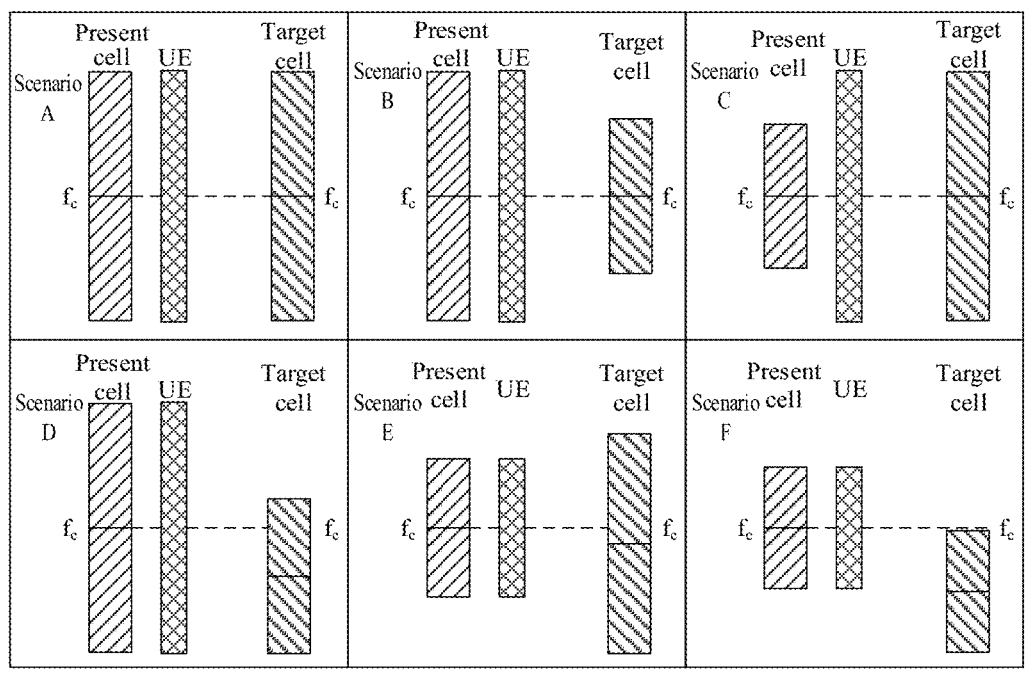
FIG. 2 is a diagram of various scenarios of inter-cell measurement performed by UE.

Whether UE requires a gap for auxiliary measurement needs six scenarios illustrated in FIG. 2 to be considered.

Scenario A (a present cell and a target cell have the same carrier frequency and the same bandwidth): this scenario involves intra-frequency measurement and no measurement gap is required.

Scenario B (the present cell and the target cell have the same carrier frequency and the bandwidth of the target cell is less than the bandwidth of the present cell): this scenario also involves intra-frequency measurement and no measurement gap is required.

Scenario C (the present cell and the target cell have the same carrier frequency and the bandwidth of the target cell is greater than the bandwidth of the present cell): this scenario also involves intra-frequency measurement and no measurement gap is required.

Scenario D (the present cell and the target cell have different carrier frequencies, the bandwidth of the target cell is less than the bandwidth of the present cell and the bandwidth of the target cell is within the bandwidth of the present cell): this scenario involves inter-frequency measurement and a measurement gap is required.

Scenario E (the present cell and the target cell have different carrier frequencies, the bandwidth of the target cell is greater than the bandwidth of the present cell and the bandwidth of the present cell is within the bandwidth of the target cell): this scenario involves inter-frequency measurement and a measurement gap is required.

Scenario F (the present cell and the target cell have different carrier frequencies and the bandwidth of the target cell does not overlap the bandwidth of the present cell): this scenario involves intra-frequency measurement and a measurement gap is required.

Figure 3:
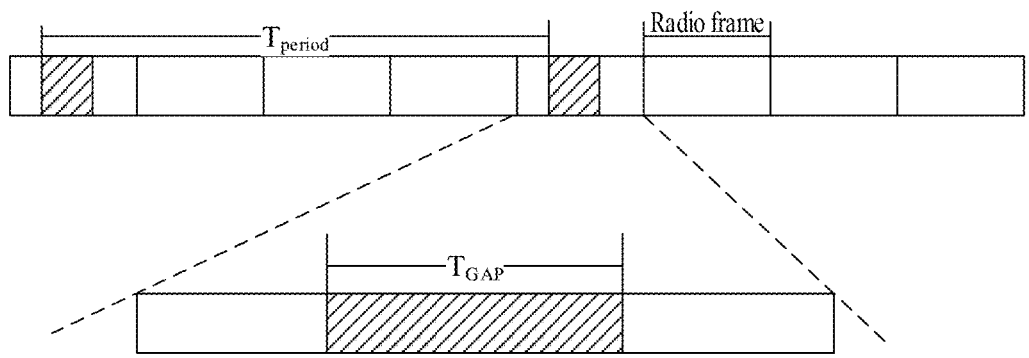
FIG. 3 is a structure diagram of a measurement gap.

When inter-frequency or inter-system measurement is required, an eNodeB may transmit a related configuration of a measurement gap, and UE instructs to start the measurement gap according to a configuration of the eNodeB. FIG. 3 is a structure diagram of a measurement gap. As illustrated in FIG. 3, the measurement gap occurs periodically at a period $T_{period}$, and UE performs measurement only within a width of the gap, i.e., $T_{GAP}$. One radio frame is 10 ms.

Measurement map modes in an LTE system usually include a mode 1 and a mode 2. In the mode 1, $T_{GAP}$ is 6 ms and $T_{period}$ is 40 ms. In the mode 2, $T_{GAP}$ is 6 ms, and $T_{period}$ is 80 ms. A network device fixedly configures a measurement gap to be the mode 1 or the mode 2, and it is very likely that the configured gap mode is mismatched with some characteristics of a present terminal device. For example, if a present movement speed of the terminal device is high, but the network device configures the mode 2 for the terminal device, that is, the period of the measurement gap is 80 ms. At this time, since the movement speed of the terminal device is high, measurement information reported at the period of 80 ms is likely inaccurate for the terminal device, which results in poor system performance.

Figure 4:
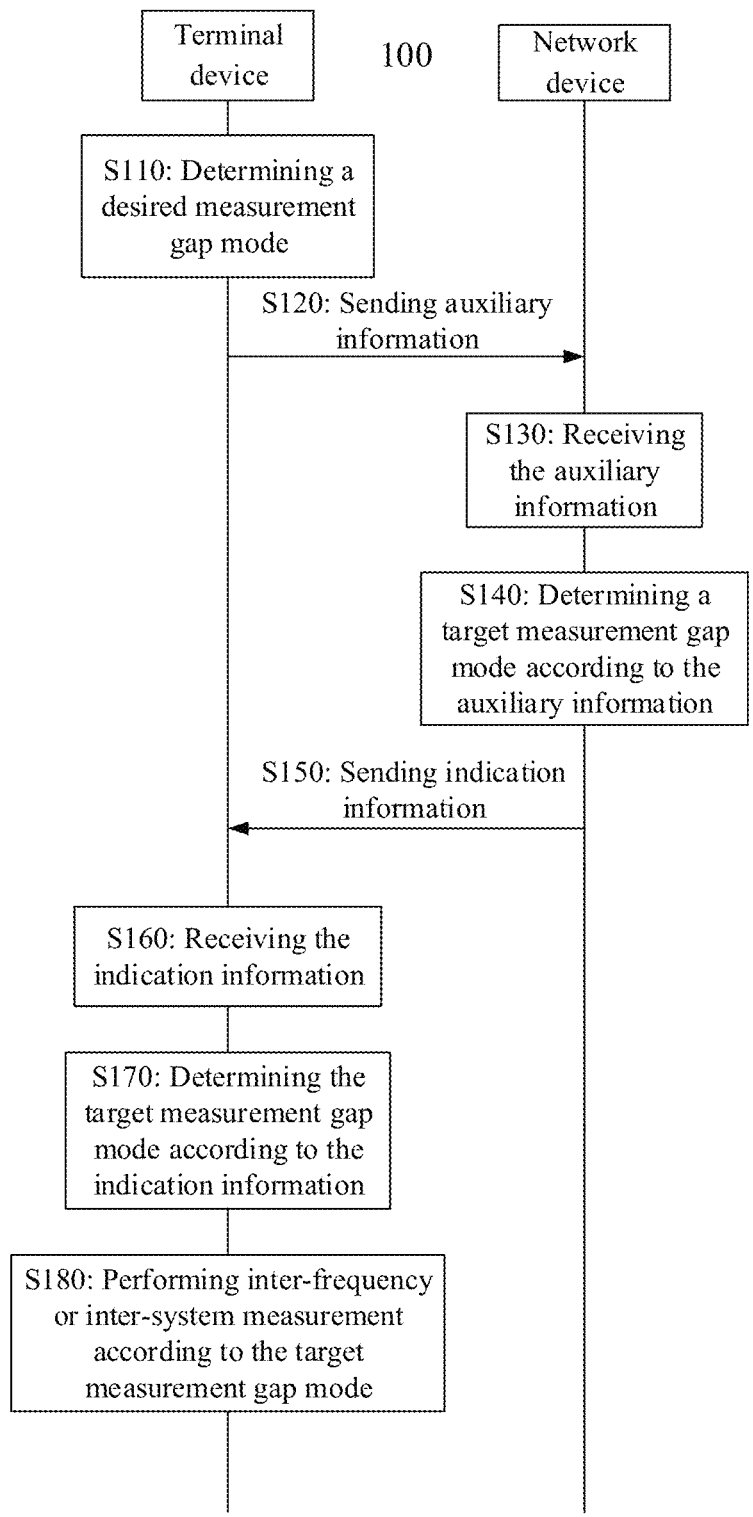
FIG. 4 is a schematic block diagram of an inter-frequency/inter-system measurement method according to an embodiment of the disclosure.

FIG. 4 is a schematic flowchart of an inter-frequency/inter-system measurement method 100 according to an embodiment of the disclosure. The method 100 may be implemented through interaction between a terminal device and a network device and, for example, may be implemented by UE and an eNodeB. As illustrated in FIG. 4, the method 100 mainly includes the following operations.

In S110, the terminal device determines a desired measurement gap mode of the terminal device in multiple measurement gap modes.

In S120, the terminal device sends to the network device auxiliary information used for determining a target measurement gap mode. The auxiliary information may be some related information of the desired measurement gap mode of the terminal device, determined in S110.

In S130, the network device receives the auxiliary information sent by the terminal device.

In S140, the network device determines the target measurement gap mode according to the auxiliary information received in S130.

In S150, the network device sends to the terminal device indication information used for indicating the target measurement gap mode determined in S140.

In S160, the terminal device receives the indication information sent by the network device in S150.

In S170, the terminal device determines, according to the indication information received in S160, the target measurement gap mode configured by the network device.

In S180, the terminal device performs inter-frequency or inter-system measurement according to the target measurement gap mode configured by the network device.

Specifically, the network device and the terminal device may predetermine multiple measurement gap modes, or the network device may also configure the multiple measurement gap modes for the terminal device in advance. The multiple measurement gap modes may include the mode 1 and the mode 2, and may also be some other modes, for example, a mode 3. A period $T_{period}$ of the mode 3 is 20 ms and $T_{GAP}$ is 6 ms. In brief, the multiple measurement gap modes are pre-configured by the network device according to some tests previously made on the system performance, or the multiple measurement gap modes are pre-stored in the device during delivery of the terminal device. When the terminal device determines that inter-frequency measurement or inter-system measurement is required, the terminal device may select a desired measurement gap mode from the multiple measurement gap modes and send some auxiliary information related to the desired measurement gap mode to the network device, so that the network device may configure a final measurement gap mode for the terminal device with reference to the desired measurement gap mode of the terminal device. For example, the auxiliary information may be the desired measurement gap mode of the terminal device and may also be an increment value of a gap period of the desired measurement gap mode with respect to a gap period of a measurement gap mode previously configured by the network device, or a ratio therebetween and the like. Any information that may allow the network device to determine the desired measurement gap mode of the terminal device may be the auxiliary information in the method 100. After the network device determines the a desired measurement gap mode of the terminal device according to the auxiliary information, the network device may further configure the target measurement gap mode for the terminal device with reference to the desired measurement gap mode of the terminal device, and indicate the target measurement gap mode configured by the network device to the terminal device. Such indication information may be sent for example through RRC signaling. The indication information may also be sent through other high-layer signaling, which will not be limited thereto in the embodiment of the disclosure. After the terminal device receives a related configuration of the measurement gap mode from the network device, the terminal device may perform inter-frequency or inter-system measurement according to the related configuration. For example, the terminal device may perform measurement of a target cell within a gap length of the target measurement gap mode configured by the network device, perform measurement periodically at a gap period of the target measurement gap mode and report a measurement result to the network device.

Therefore, according to the inter-frequency/inter-system measurement method of the embodiment of the disclosure, the terminal device sends some auxiliary information to the network device such that the network device can better understand the performance of the terminal device and thus further configure a suitable measurement gap mode, which facilitates to improve accuracy of a measurement report, thereby improving system performance.

In the embodiment of the disclosure, the terminal device may further determine the desired measurement gap mode of the terminal device in combination with some characteristics of the terminal device. Specifically, the operation that the terminal device determines the desired measurement gap mode in the multiple measurement gap modes includes the following action. The terminal device determines the desired measurement gap mode in the multiple measurement gap modes according to at least one of the following information: movement speed information of the terminal device, QoS information of a present service of the terminal device, QoS information of a detected service of the terminal device or present channel quality information of the terminal device.

The terminal device may operate in combinations with some information related to the measurement gap mode and capable of affecting the system performance, for example, the movement speed information of the terminal device. The network device may negotiate with the terminal device in advance or certain thresholds may be pre-configured by the network device. For example, it may be considered that a movement speed of the terminal device being greater than 5 m/s is high, and the movement speed of the terminal device being less than or equal to 5 m/s is low. Then, when the movement speed of the terminal device is relatively high, the gap period of the measurement gap mode may be configured to be relatively short; and when the movement speed of the terminal device is relatively low, the gap period of the measurement gap mode may be configured to be relatively long. Therefore, the performance of the terminal device may be combined with the measurement gap mode more flexibly.

The procedure that the terminal device determines the desired measurement gap mode in the inter-frequency/inter-system measurement method 100 of the embodiment of the disclosure will be described below in detail.

In the embodiment of the disclosure, the operation that the terminal device determines the desired measurement gap mode in the multiple measurement gap modes according to the movement speed information of the terminal device includes the following actions. If a movement speed of the terminal device is greater than or equal to a first threshold, the terminal device determines a first measurement gap mode in the multiple measurement gap modes as the desired measurement gap mode. If the movement speed of the terminal device is less than the first threshold, the terminal device determines a second measurement gap mode in the multiple measurement gap modes as the desired measurement gap mode. A gap period of the first measurement gap mode is less than a gap period of the second measurement gap mode.

Specifically, the terminal device may select the desired measurement gap mode from the multiple measurement gap modes according to the movement speed information thereof. An implementation mode of the disclosure has been described above by taking the movement speed of the terminal device as an example. Selecting of the desired measurement gap mode in combination with the movement speed of the terminal device may be under the premise that the terminal device moves at a constant speed. If the terminal device moves at a variable speed at present, the terminal device may also select the desired measurement gap mode according to acceleration thereof. For example, if a present acceleration is high, the terminal device may select a gap mode with a short gap period from the multiple measurement gap modes; and if the present acceleration is small, the terminal device may select a gap mode with a relatively long gap period from the multiple measurement gap modes. It is to be understood that the speed information in the embodiment of the disclosure includes, but not limited to, the speed and the acceleration as mentioned above.

It is also to be understood that specific implementation of the embodiment of the disclosure is described above by taking one threshold as an example. Multiple thresholds may also be adopted for division. For example, a speed within 5 m/s may be considered as a low speed, a speed within 5 m/s~10 m/s may be considered as an intermediate speed, and a speed above 10 m/s may be considered as a high speed. Similarly, the terminal device may configure different desired measurement gap modes of the terminal device for different speed ranges. The embodiment of the disclosure is not limited thereto.

In the embodiment of the disclosure, the operation that the terminal device determines the desired measurement gap mode in the multiple measurement gap modes according to the QoS information of the present service of the terminal device includes the following actions. If a service delay requirement in the QoS information of the present service is greater than or equal to a second threshold, the terminal device determines a third measurement gap mode in the multiple measurement gap modes as the desired measurement gap mode. If the service delay requirement in the QoS information of the present service is less than the second threshold, the terminal device determines a fourth measurement gap mode in the multiple measurement gap modes as the desired measurement gap mode. A gap period of the third measurement gap mode is greater than a gap period of the fourth measurement gap mode.

In the embodiment of the disclosure, the operation that the terminal device determines the desired measurement gap mode in the multiple measurement gap modes according to the QoS information of the present service of the terminal device includes the following actions. If a data rate in the QoS information of the present service is greater than or equal to a third threshold, the terminal device determines a fifth measurement gap mode in the multiple measurement gap modes as the desired measurement gap mode. If the data rate in the QoS information of the present service is less than the third threshold, the terminal device determines a sixth measurement gap mode in the multiple measurement gap modes as the desired measurement gap mode. A gap period of the fifth measurement gap mode is less than a gap period of the sixth measurement gap mode.

In the embodiment of the disclosure, the operation that the terminal device determines the desired measurement gap mode in the multiple measurement gap modes according to the QoS information of the detected service includes the following actions. If a service delay in the QoS information of the detected service is greater than or equal to a fourth threshold, the terminal device determines a seventh measurement gap mode in the multiple measurement gap modes as the desired measurement gap mode. If the service delay in the QoS information of the detected service is less than the fourth threshold, the terminal device determines an eighth measurement gap mode in the multiple measurement gap modes as the desired measurement gap mode. A gap period of the seventh measurement gap mode is greater than a gap period of the eighth measurement gap mode.

In the embodiment of the disclosure, the operation that the terminal device determines the desired measurement gap mode in the multiple measurement gap modes according to the QoS information of the detected service includes the following actions. If a data rate in the QoS information of the detected service is greater than or equal to a fifth threshold, the terminal device determines a ninth measurement gap mode in the multiple measurement gap modes as the desired measurement gap mode. If the data rate in the QoS information of the detected service is less than the fifth threshold, the terminal device determines a tenth measurement gap mode in the multiple measurement gap modes as the desired measurement gap mode. A gap period of the ninth measurement gap mode is less than a gap period of the tenth measurement gap mode.

Quality of service is guaranteed so as to provide one or more satisfactory services for a user. Different types of services have different requirements on QoS. A conventional parameter for judging the quality of service (i.e., QoS parameter) includes an end-to-end delay, jitter, a data rate, a packet loss rate, network throughput, reliability of data transmission and the like. The technical solution of the disclosure is described above by taking the delay as an example, and the embodiment of the disclosure is not limited thereto. For example, the network device may empirically configure at least one threshold in advance for the network throughput in the QoS parameter based on experiences, and divide the network throughput into multiple different segments, where different segments correspond to different measurement gap modes. In this way, the terminal device, after knowing the specific network throughput of the present service thereof, may judge a range to which the network throughput belongs and determine a measurement gap mode corresponding to the range as the desired measurement gap mode of the terminal device. Similarly, other parameters in the QoS parameters of the present service involved in the disclosure may refer to the network throughput or the service delay and will not be elaborated herein.

In the embodiment of the disclosure, the operation that the terminal device determines the desired measurement gap mode in the multiple measurement gap modes according to the present channel quality information of the terminal device includes the following actions. If a present channel quality of the terminal device is less than a sixth threshold, the terminal device determines an eleventh measurement gap mode in the multiple measurement gap modes as the desired measurement gap mode. If the present channel quality of the terminal device is greater than or equal to the sixth threshold, the terminal device determines a twelfth measurement gap mode in the multiple measurement gap modes as the desired measurement gap mode. A gap period of the eleventh measurement gap mode is less than a gap period of the twelfth measurement gap mode.

Similarly, the terminal device may also determine the desired measurement gap mode of the terminal device in combination with a preset channel quality condition. The determination manner is the same as that described above and will not be elaborated herein for simplicity.

It is to be understood that each threshold, i.e., division manner, and each correspondence may be defined by a protocol or pre-configured by the network device. The definition by the protocol may refer to defining a factory default configuration of the terminal device.

It is also to be understood that each characteristic of the terminal device in the embodiment of the disclosure is only for schematic description and will not be limited thereto in the embodiment of the disclosure.

It is further to be understood that a combination of each characteristic of the terminal may be associated with the measurement gap mode. For example, it may be predetermined that the movement speed and the delay requirement of the present service form a certain mapping relationship with the measurement gap mode; it may also be predetermined that the delay requirement of the present service and the data rate of the present service form a certain mapping relationship with the measurement gap mode; and it may also be predetermined that the movement speed of the terminal, the QoS parameter of the present service and the present channel quality of the terminal device form a certain mapping relationship with the measurement gap mode. The present disclosure is not limited thereto.

Figure 5:
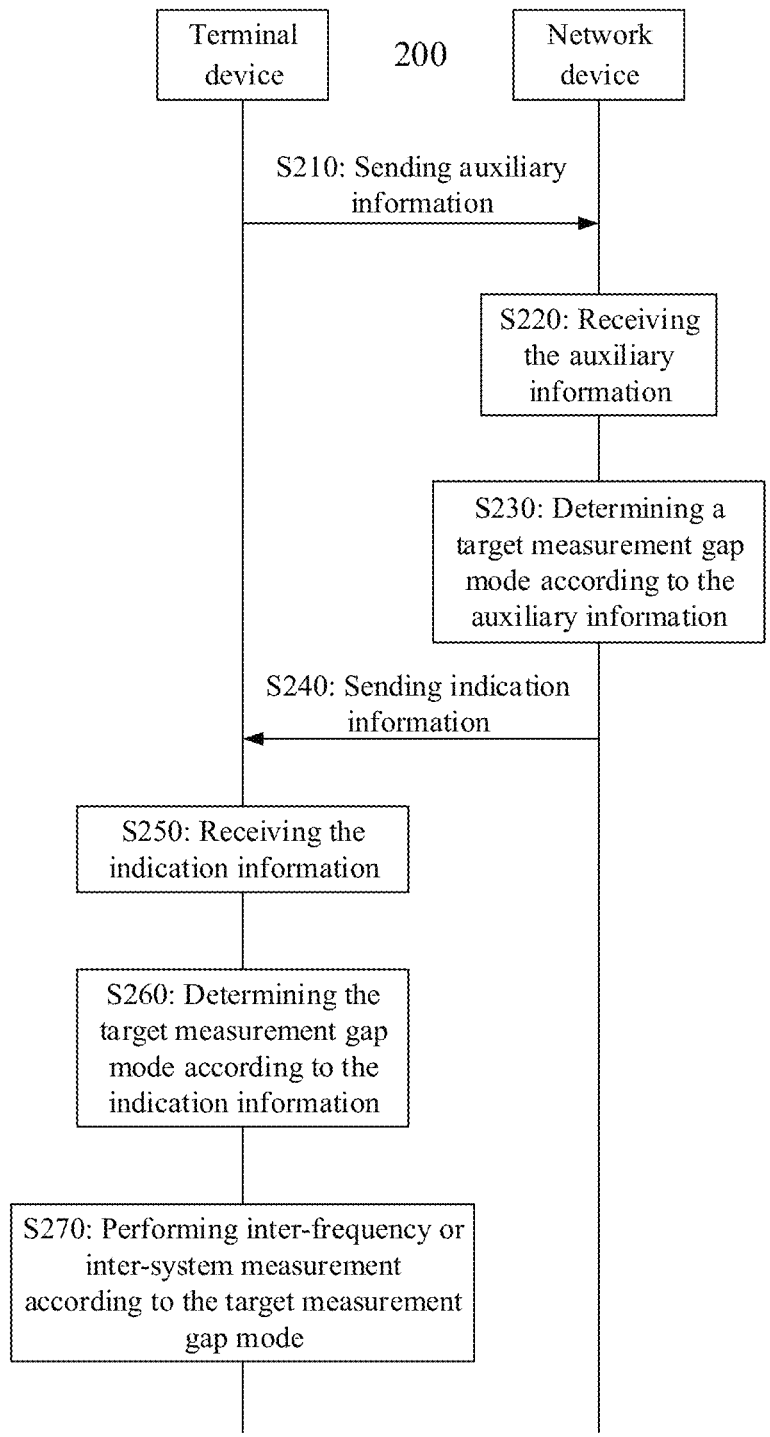
FIG. 5 is another schematic block diagram of an inter-frequency/inter-system measurement method according to an embodiment of the disclosure.

FIG. 5 is a schematic flowchart of an inter-frequency/inter-system measurement method 200 according to an embodiment of the disclosure. The method 200 may be implemented through interaction between a terminal device and a network device and, for example, may be implemented by UE and an eNodeB. As illustrated in FIG. 5, the method 200 mainly includes the following operations.

In S210, the terminal device sends to the network device auxiliary information used for determining a target measurement gap mode.

In S220, the network device receives the auxiliary information sent by the terminal device.

In S230, the network device determines the target measurement gap mode for inter-frequency/inter-system measurement according to the auxiliary information received in S220.

In S240, the network device sends to the terminal device indication information for the target measurement gap mode determined in S230.

In S250, the terminal device receives the indication information sent by the network device in S240.

In S260, the terminal device determines the target measurement gap mode according to the indication information received in S250.

In S270, the terminal device performs inter-frequency/inter-system measurement according to the target measurement gap mode determined in S260.

First of all, the following contents are to be noted.

Firstly: the auxiliary information may be some specific information assisting in determination of the measurement gap mode, such as movement speed information of the terminal device or some transmission characteristics of a present service of the terminal device.

Secondly: the measurement gap mode may be different from a measurement gap mode in related art. That is, in the embodiment of the disclosure, the measurement gap mode is not limited to the mode 1 or the mode 2, and may also be another mode pre-configured by a network or predetermined according to a protocol, for example, a mode 3 with $T_{period}$ of 20 ms and $T_{GAP}$ of 6 ms. The target measurement gap mode may be determined in combination with the auxiliary information.

Thirdly: in related art, a terminal device may send triggering information to a network device. After receiving the triggering information, the network device may independently determine whether a measurement gap is required to be configured, and further configures the measurement gap after determining the measurement gap. While in the embodiment of the disclosure, the terminal device may send the auxiliary information to the network device at the same time of sending triggering information to the network device, and the terminal device may also independently send the auxiliary information to the network device. The embodiment of the disclosure is not limited thereto.

Fourth: the network device may be an access network device, and its acquired auxiliary information may be sent by the terminal device and may also be sent by a core network device.

It is to be understood that the method 200 differs from the method 100 in the following. In the method 100, the terminal device may firstly determine the desired measurement gap mode of the terminal device in combination with some characteristics of the terminal device, and then sends the desired measurement gap mode determined by the terminal device to the network device as a reference for determination of the target measurement gap mode by the network device. In the method 200, the terminal device directly reports some characteristics of the terminal device to the network device, and the network device independently configures a suitable target measurement gap mode for the terminal device in combination with the characteristics of the terminal device.

Therefore, according to the inter-frequency/inter-system measurement method of the embodiment of the disclosure, the terminal device reports to the network device some auxiliary information used for determining the target measurement gap mode, so that the network device configures the measurement gap mode for the terminal device in combination with the auxiliary information, and thus performance of the terminal device may be better matched with the measurement gap mode, which facilitates to improve the system performance.

In the embodiment of the disclosure, the auxiliary information includes at least one of the following information: movement speed information of the terminal device, QoS information of a present service of the terminal device, QoS information of a detected service of the terminal device or present channel quality information of the terminal device.

Specifically, the network device may pre-configure a kind of criterion for some characteristics of the terminal device. Taking the movement speed information reported by the terminal device as an example, the network device may pre-configure some thresholds. For example, a movement speed of the terminal device being greater than 5 m/s may be considered as a high speed, and the movement speed of the terminal device being less than or equal to 5 m/s is a low speed. Then, when the movement speed of the terminal device is high, the gap period of the measurement gap mode may be configured to be relatively short; while when the movement speed of the terminal device is low, the gap period of the measurement gap mode may be configured to be relatively long. Therefore, the performance of the terminal device may be combined with the measurement gap mode more flexibly.

In the embodiment of the disclosure, the auxiliary information includes the movement speed information of the terminal device, and the operation that the network device determines the target measurement gap mode for inter-frequency/inter-system measurement according to the auxiliary information includes the following operations. If a movement speed of the terminal device is greater than or equal to a first threshold, the network device determines a gap mode of which a gap period is a first period as the target measurement gap mode. If the movement speed of the terminal device is less than the first threshold, the network device determines a gap mode of which a gap period is a second period as the target measurement gap mode. The first period is less than the second period.

An implementation mode of the disclosure has been described above by taking the movement speed of the terminal device as an example. Determination of the target measurement gap mode in combination with the movement speed reported by the terminal device may be under the premise that the terminal device moves at a constant speed. If the terminal device moves at a variable speed at present, the terminal device may also report acceleration thereof to determine the target measurement gap mode. For example, if a present acceleration is high, the network device may configure a gap mode with a relatively short gap period; and if the present acceleration is low, the network device may configure a gap mode with a relatively long gap period. It is to be understood that the speed information in the embodiment of the disclosure includes, but not limited to, the speed and the acceleration.

In the embodiment of the disclosure, the auxiliary information includes the QoS information of the present service of the terminal device, and the operation that the network device determines the target measurement gap mode for inter-frequency/inter-system measurement according to the auxiliary information includes the following operations. If a service delay in the QoS information of the present service is greater than or equal to a second threshold, the network device determines a gap mode of which a gap period is a third period as the target measurement gap mode. If the service delay in the QoS information of the present service is less than the second threshold, the network device determines a gap mode of which a gap period is a fourth period as the target measurement gap mode. The third period is greater than the fourth period.

In the embodiment of the disclosure, the auxiliary information includes the QoS information of the present service of the terminal device, and the operation that the network device determines the target measurement gap mode for inter-frequency/inter-system measurement according to the auxiliary information includes the following operations. If a data rate in the QoS information of the present service is greater than or equal to a third threshold, the network device determines a gap mode of which a gap period is a fifth period as the target measurement gap mode. If the data rate in the QoS information of the present service is less than the third threshold, the network device determines a gap mode of which a gap period is a sixth period as the target measurement gap mode. The fifth period is less than the sixth period.

In the embodiment of the disclosure, the auxiliary information includes the QoS information of the detected service of the terminal device, and the operation that the network device determines the target measurement gap mode for inter-frequency/inter-system measurement according to the auxiliary information includes the following operations. If a service delay in the QoS information of the detected service is greater than or equal to a fourth threshold, the network device determines a gap mode of which a gap period is a seventh period as the target measurement gap mode. If the service delay in the QoS information of the detected service is less than the fourth threshold, the network device determines a gap mode of which a gap period is an eighth period as the target measurement gap mode. The seventh period is greater than the eighth period.

In the embodiment of the disclosure, the auxiliary information includes the QoS information of the detected service of the terminal device, and the operation that the network device determines the target measurement gap mode for inter-frequency/inter-system measurement according to the auxiliary information includes the following operations. If a data rate in the QoS information of the detected service is greater than or equal to a fifth threshold, the network device determines a gap mode of which a gap period is a ninth period as the target measurement gap mode. If the data rate in the QoS information of the detected service is less than the fifth threshold, the network device determines a gap mode of which a gap period is a tenth period as the target measurement gap mode. The ninth period is greater than the tenth period.

A conventional parameter for judging quality of service (i.e., QoS parameter) includes an end-to-end delay, jitter, a data rate, a packet loss rate, network throughput, reliability of data transmission and the like. Other parameters in the QoS parameters of the present service involved in the embodiment of the disclosure may refer to the service delay or the data rate and will not be elaborated herein.

In the embodiment of the disclosure, the auxiliary information includes the present channel quality information of the terminal device, and the operation that the network device determines the target measurement gap mode for inter-frequency/inter-system measurement according to the auxiliary information includes the following actions. If a present channel quality of the terminal device is less than a sixth threshold, the network device determines a gap mode of which a gap period is an eleventh period as the target measurement gap mode. If the present channel quality of the terminal device is greater than or equal to the sixth threshold, the network device determines a gap mode of which a gap period is a twelfth period as the target measurement gap mode. The eleventh period is less than the twelfth period.

Similarly, the network device may also determine the target measurement gap mode in combination with a present channel quality condition reported by the terminal device. The determination manner is the same as that described above and will not be elaborated herein for simplicity.

It is to be understood that each threshold, i.e., division manner, may be defined by a protocol or pre-configured by the network device. Definition by the protocol may refer to defining a factory default configuration of the terminal device.

It is also to be understood that characteristics of various terminal devices reported by the terminal device in the embodiment of the disclosure is only for schematic description and will not be limited thereto in the embodiment of the disclosure.

In the embodiment of the disclosure, the operation that the network device sends to the terminal device the indication information used for indicating the target measurement gap mode includes that the network device sends the indication information through RRC signaling.

Specifically, such indication may be sent through the RRC signaling. The indication information may also be sent through other high-layer signaling such as MAC signaling, which will not be limited thereto in the embodiment of the disclosure.

It is further to be understood that a combination of characteristics of various terminals may be associated with the measurement gap mode. For example, the target measurement gap mode may be determined according to a movement speed and a delay requirement of the present service; the target measurement gap mode may also be determined according to the delay requirement of the present service and the data rate of the present service; and the target measurement gap mode may further be determined according to the movement speed of the terminal device, the QoS parameter of the present service and the present channel quality of the terminal device. The disclosure is not limited thereto.

Figure 6:
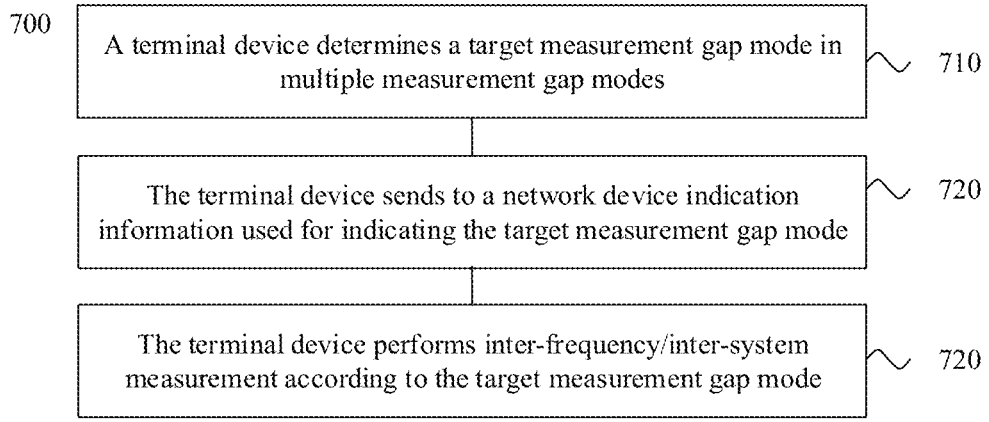
FIG. 6 is yet another schematic block diagram of an inter-frequency/inter-system measurement method according to an embodiment of the disclosure.

FIG. 6 is a schematic block diagram of an inter-frequency/inter-system measurement method 700 according to an embodiment of the disclosure. As illustrated in FIG. 6, the method 700 includes the following operations.

In S710, a terminal device determines a target measurement gap mode in multiple measurement gap modes.

In S720, the terminal device sends indication information configured to indicate the target measurement gap mode to a network device.

In S730, the terminal device performs inter-frequency/inter-system measurement according to the target measurement gap mode.

Therefore, according to the inter-frequency/inter-system measurement method of the embodiment of the disclosure, the terminal device selects a suitable measurement gap mode for inter-frequency/inter-system measurement from the multiple measurement gap modes, which is favorable for reducing a network overhead.

In the embodiment of the disclosure, the operation that the terminal device determines the target measurement gap mode in the multiple measurement gap modes includes the following action. The terminal device determines the target measurement gap mode in the multiple measurement gap modes according to at least one of the following information: movement speed information of the terminal device, QoS information of a present service of the terminal device, QoS information of a detected service of the terminal device or present channel quality information of the terminal device.

In the embodiment of the disclosure, the operation that the terminal device determines the target measurement gap mode in the multiple measurement gap modes according to the movement speed information of the terminal device includes the following actions. If a movement speed of the terminal device is greater than or equal to a first threshold, the terminal device determines a first measurement gap mode in the multiple measurement gap modes as the target measurement gap mode.

If the movement speed of the terminal device is less than the first threshold, the terminal device determines a second measurement gap mode in the multiple measurement gap modes as the target measurement gap mode. A gap period of the first measurement gap mode is less than a gap period of the second measurement gap mode.

In the embodiment of the disclosure, the operation that the terminal device determines the target measurement gap mode in the multiple measurement gap modes according to the QoS information of the present service of the terminal device includes the following actions. If a service delay requirement in the QoS information of the present service is greater than or equal to a second threshold, the terminal device determines a third measurement gap mode in the multiple measurement gap modes as the target measurement gap mode. If the service delay requirement in the QoS information of the present service is less than the second threshold, the terminal device determines a fourth measurement gap mode in the multiple measurement gap modes as the target measurement gap mode. A gap period of the third measurement gap mode is greater than a gap period of the fourth measurement gap mode.

In the embodiment of the disclosure, the operation that the terminal device determines the target measurement gap mode in the multiple measurement gap modes according to the QoS information of the present service of the terminal device includes the following actions. If a data rate requirement in the QoS information of the present service is greater than or equal to a third threshold, the terminal device determines a fifth measurement gap mode in the multiple measurement gap modes as the target measurement gap mode. If the data rate requirement in the QoS information of the present service is less than the third threshold, the terminal device determines a sixth measurement gap mode in the multiple measurement gap modes as the target measurement gap mode. A gap period of the fifth measurement gap mode is lesser than a gap period of the sixth measurement gap mode.

In the embodiment of the disclosure, the operation that the terminal device determines the target measurement gap mode in the multiple measurement gap modes according to the QoS information of the detected service includes the following actions. If a service delay in the QoS information of the detected service is greater than or equal to a fourth threshold, the terminal device determines a seventh measurement gap mode in the multiple measurement gap modes as the target measurement gap mode. If the service delay in the QoS information of the detected service is less than the fourth threshold, the terminal device determines an eighth measurement gap mode in the multiple measurement gap modes as the target measurement gap mode. A gap period of the seventh measurement gap mode is greater than a gap period of the eighth measurement gap mode.

In the embodiment of the disclosure, the operation that the terminal device determines the target measurement gap mode in the multiple measurement gap modes according to the QoS information of the detected service includes the following actions. If a data rate in the QoS information of the detected service is greater than or equal to a fifth threshold, the terminal device determines a ninth measurement gap mode in the multiple measurement gap modes as the target measurement gap mode. If the data rate in the QoS information of the detected service is less than the fifth threshold, the terminal device determines a tenth measurement gap mode in the multiple measurement gap modes as the target measurement gap mode. A gap period of the ninth measurement gap mode is less than a gap period of the tenth measurement gap mode.

In the embodiment of the disclosure, the operation that the terminal device determines the target measurement gap mode in the multiple measurement gap modes according to the present channel quality information of the terminal device includes the following actions. If a present channel quality of the terminal device is less than a sixth threshold, the terminal device determines an eleventh measurement gap mode in the multiple measurement gap modes as the target measurement gap mode. If the present channel quality of the terminal device is greater than or equal to the sixth threshold, the terminal device determines a twelfth measurement gap mode in the multiple measurement gap modes as the target measurement gap mode. A gap period of the eleventh measurement gap mode is less than a gap period of the twelfth measurement gap mode.

Selecting the target measurement gap mode from the multiple measurement gap modes in combination with the characteristics of the terminal device may better determine the suitable measurement gap mode, thereby facilitating to improve system performance.

In the embodiment of the disclosure, the multiple measurement gap modes are predetermined according to a protocol or pre-configured by the network device.

Figure 7:
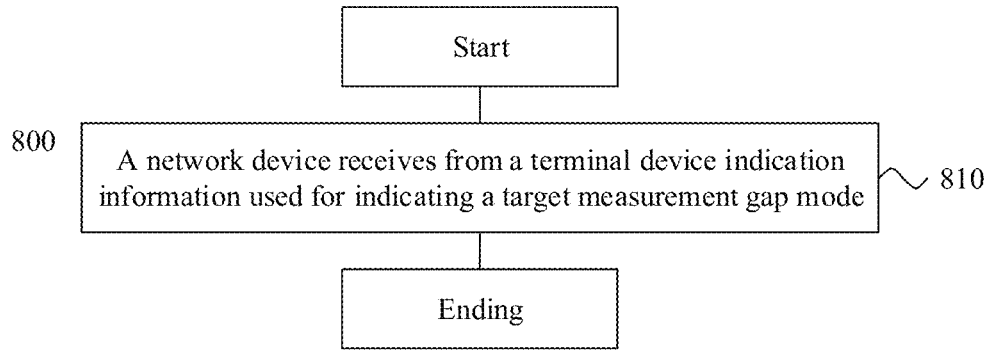
FIG. 7 is still another schematic block diagram of an inter-frequency/inter-system measurement method according to an embodiment of the disclosure.

FIG. 7 is also a schematic block diagram of an inter-frequency/inter-system measurement method 800 according to an embodiment of the disclosure. As shown in FIG. 7, the method 800 includes the following operation of S810.

In S810, a network device receives indication information used for indicating a target measurement gap mode from a terminal device.

It is to be understood that interaction between the network device and the terminal device and related characteristics, functions and the like described based on the network device correspond to related characteristics and functions of the terminal device. That is, if the terminal device sends information to the network device, the network device may receive the corresponding information sent by the terminal device. For simplicity, no more elaborations will be made herein.

It is also to be understood that, in various embodiments of the disclosure, a magnitude of a sequence number of the above operations does not mean an execution sequence and the execution sequence of above operations should be determined by their functions and internal logics, and should not form any limitation to an implementation process of the embodiments of the disclosure.

The inter-frequency/inter-system measurement method according to the embodiments of the disclosure is described above in detail and an inter-frequency/inter-system measurement device according to the embodiments of the disclosure will be described below in combination with FIG. 8 to FIG. 15. The technical characteristics described in the method embodiments are applied to the following device embodiments.

Figure 8:
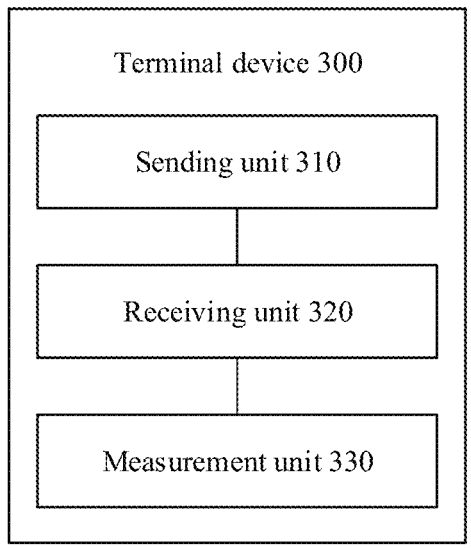
FIG. 8 is a schematic block diagram of a terminal device according to an embodiment of the disclosure.

FIG. 8 is a schematic block diagram of a terminal device 300 according to an embodiment of the disclosure. As illustrated in FIG. 8, the terminal device 300 includes a sending unit 310, a receiving unit 320 and a measurement unit 330.

The sending unit 310 sends to a network device auxiliary information used for determining a target measurement gap mode.

The receiving unit 320 is configured to receive indication information sent by a network device, the indication information being used for indicating the target measurement gap mode.

The measurement unit 330 is configured to perform inter-frequency/inter-system measurement according to the target measurement gap mode.

Therefore, the terminal device of the embodiment of the disclosure reports to the network device some auxiliary information used for determining the target measurement gap mode, so that the network device configures the measurement gap mode for the terminal device in combination with the auxiliary information, and thus performance of the terminal device may be matched with the measurement gap mode better, which is favorable for improving system performance.

In at least one embodiment of the disclosure, the auxiliary information is a desired measurement gap mode of the terminal device or an increment value of a gap period of the desired measurement gap mode of the terminal device relative to a gap period of a measurement gap mode previously configured by the network device. The terminal device 300 further includes a determination unit 340 configured to determine the desired measurement gap mode in multiple measurement gap modes.

In at least one embodiment of the disclosure, the determination unit is specifically configured to determine the desired measurement gap mode in the multiple measurement gap modes according to at least one of the following information: movement speed information of the terminal device, QoS information of a present service of the terminal device, QoS information of a detected service of the terminal device or present channel quality information of the terminal device.

In at least one embodiment of the disclosure, the determination unit is specifically configured to: if a movement speed of the terminal device is greater than or equal to a first threshold, determine a first measurement gap mode in the multiple measurement gap modes as the desired measurement gap mode; and if the movement speed of the terminal device is less than the first threshold, determine a second measurement gap mode in the multiple measurement gap modes as the desired measurement gap mode. A gap period of the first measurement gap mode is less than a gap period of the second measurement gap mode.

In at least one embodiment of the disclosure, the determination unit is specifically configured to: if a service delay requirement in the QoS information of the present service is greater than or equal to a second threshold, determine a third measurement gap mode in the multiple measurement gap modes as the desired measurement gap mode; and if the service delay requirement in the QoS information of the present service is less than the second threshold, determine a fourth measurement gap mode in the multiple measurement gap modes as the desired measurement gap mode. A gap period of the third measurement gap mode is greater than a gap period of the fourth measurement gap mode.

In at least one embodiment of the disclosure, the determination unit is specifically configured to: if a data rate requirement in the QoS information of the present service is greater than or equal to a third threshold, determine a fifth measurement gap mode in the multiple measurement gap modes as the desired measurement gap mode; and if the data rate requirement in the QoS information of the present service is less than the third threshold, determine a sixth measurement gap mode in the multiple measurement gap modes as the desired measurement gap mode. A gap period of the fifth measurement gap mode is less than a gap period of the sixth measurement gap mode.

In at least one embodiment of the disclosure, the determination unit is specifically configured to: if a service delay in the QoS information of the detected service is greater than or equal to a fourth threshold, determine a seventh measurement gap mode in the multiple measurement gap modes as the desired measurement gap mode; and if the service delay in the QoS information of the detected service is less than the fourth threshold, determine an eighth measurement gap mode in the multiple measurement gap modes as the desired measurement gap mode. A gap period of the seventh measurement gap mode is greater than a gap period of the eighth measurement gap mode.

In at least one embodiment of the disclosure, the determination unit is specifically configured to: if a data rate in the QoS information of the detected service is greater than or equal to a fifth threshold, determine a ninth measurement gap mode in the multiple measurement gap modes as the desired measurement gap mode, and if the data rate in the QoS information of the detected service is less than the fifth threshold, determine a tenth measurement gap mode in the multiple measurement gap modes as the desired measurement gap mode. A gap period of the ninth measurement gap mode is less than a gap period of the tenth measurement gap mode.

In at least one embodiment of the disclosure, the determination unit is specifically configured to: if present channel quality of the terminal device is greater than or equal to a sixth threshold, determine an eleventh measurement gap mode in the multiple measurement gap modes as the desired measurement gap mode; and if the present channel quality of the terminal device is less than the sixth threshold, determine a twelfth measurement gap mode in the multiple measurement gap modes as the desired measurement gap mode. A gap period of the eleventh measurement gap mode is less than a gap period of the twelfth measurement gap mode.

In at least one embodiment of the disclosure, the multiple measurement gap modes are predetermined according to a protocol or pre-configured by the network device.

In at least one embodiment of the disclosure, the auxiliary information includes at least one of the following information: the movement speed information of the terminal device, the QoS information of the present service of the terminal device, the QoS information of the detected service of the terminal device or the present channel quality information of the terminal device.

In at least one embodiment of the disclosure, the receiving unit is specifically configured to receive the indication information through RRC signaling.

It is to be understood that the terminal device 300 according to the embodiment of the disclosure may correspond to the terminal device in the method embodiment of the disclosure, and the abovementioned and other operations and/or functions of various units in the terminal device 300 are adopted to implement the corresponding flows executed by the terminal device in each method illustrated in FIG. 4 and FIG. 5 respectively and will not be elaborated herein for simplicity.

Figure 9:
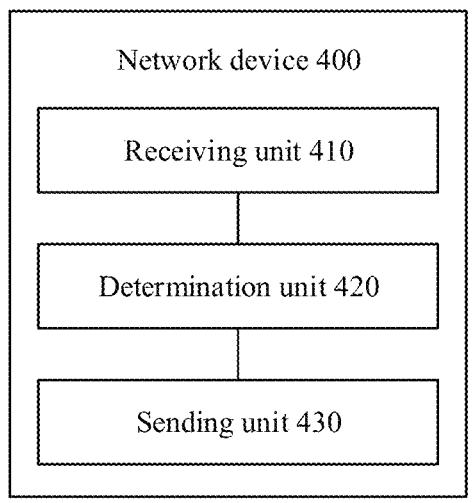
FIG. 9 is a schematic block diagram of a network device according to an embodiment of the disclosure.

FIG. 9 is a schematic block diagram of a network device 400 according to an embodiment of the disclosure. As illustrated in FIG. 9, the network device 400 includes a receiving unit 410, a determination unit 420 and a sending unit 430.

The receiving unit 410 is configured to receive auxiliary information of a measurement gap from a terminal device.

The determination unit 420 is configured to determine a target measurement gap mode for inter-frequency/inter-system measurement according to the auxiliary information.

The sending unit 430 is configured to send to the terminal device indication information used for indicating the target measurement gap mode.

Therefore, the network device of the embodiment of the disclosure configures the measurement gap mode for the terminal device in combination with some auxiliary information reported by the terminal device to determine the target measurement gap mode, so that performance of the terminal device may be matched with the measurement gap mode better, which is favorable for improving system performance.

In at least one embodiment of the disclosure, the auxiliary information includes at least one of the following information: movement speed information of the terminal device, QoS information of a present service of the terminal device, QoS information of a detected service of the terminal device or present channel quality information of the terminal device.

In at least one embodiment of the disclosure, the auxiliary information includes the movement speed information of the terminal device, and the determination unit is specifically configured to: if a movement speed of the terminal device is greater than or equal to a first threshold, determine a gap mode of which a gap period is a first period as the target measurement gap mode; and if the movement speed of the terminal device is less than the first threshold, determine a gap mode of which a gap period is a second period as the target measurement gap mode. The first period is less than the second period.

In at least one embodiment of the disclosure, the auxiliary information includes the QoS information of the present service of the terminal device, and the determination unit is specifically configured to: if a service delay in the QoS information of the present service is greater than or equal to a second threshold, determine a gap mode of which a gap period is a third period as the target measurement gap mode; and if the service delay in the QoS information of the present service is less than the second threshold, determine a gap mode of which a gap period is a fourth period as the target measurement gap mode. The third period is greater than the fourth period.

In at least one embodiment of the disclosure, the auxiliary information includes the QoS information of the present service of the terminal device, and the determination unit is specifically configured to: if a data rate requirement in the QoS information of the present service is greater than or equal to a third threshold, determine a gap mode of which a gap period is a fifth period as the target measurement gap mode; and if the data rate requirement in the QoS information of the present service is less than the third threshold, determine a gap mode of which a gap period is a sixth period as the target measurement gap mode. The fifth period is less than the sixth period.

In at least one embodiment of the disclosure, the auxiliary information includes the QoS information of the detected service of the terminal device, and the determination unit is specifically configured to: if a service delay in the QoS information of the detected service is greater than or equal to a fourth threshold, determine a gap mode of which a gap period is a seventh period as the target measurement gap mode; and if the service delay in the QoS information of the detected service is less than the fourth threshold, determine a gap mode of which a gap period is an eighth period as the target measurement gap mode. The seventh period is greater than the eighth period.

In at least one embodiment of the disclosure, the auxiliary information includes the QoS information of the detected service of the terminal device, and the determination unit is specifically configured to: if a data rate in the QoS information of the detected service is greater than or equal to a fifth threshold, determine a gap mode of which a gap period is a ninth period as the target measurement gap mode; and if the data rate in the QoS information of the detected service is less than the fifth threshold, determine a gap mode of which a gap period is a tenth period as the target measurement gap mode. The ninth period is greater than the tenth period.

In at least one embodiment of the disclosure, the auxiliary information includes the present channel quality information of the terminal device, and the determination unit is specifically configured to: if present channel quality of the terminal device is less than a sixth threshold, determine a gap mode of which a gap period is an eleventh period as the target measurement gap mode; and if the present channel quality of the terminal device is greater than or equal to the sixth threshold, determine a gap mode of which a gap period is a twelfth period as the target measurement gap mode. The eleventh period is less than the twelfth period.

In at least one embodiment of the disclosure, the auxiliary information is a desired measurement gap mode of the terminal device or an increment value of a gap period of the desired measurement gap mode of the terminal device with respect to a gap period of a measurement gap mode previously configured by the network device, and the determination unit is specifically configured to determine, by the network device, the target measurement gap mode according to the desired measurement gap mode of the terminal device or the increment value.

In at least one embodiment of the disclosure, the sending unit is specifically configured to send the indication information to the terminal device through RRC signaling.

It is to be understood that the network device 400 according to the embodiment of the disclosure may correspond to the network device in the method embodiment of the disclosure, and the abovementioned and other operations and/or functions of various units in the network device 400 are used to implement the corresponding flows executed by the network device in each method in FIG. 4 and FIG. 5 respectively and will not be elaborated herein for simplicity.

Figure 10:
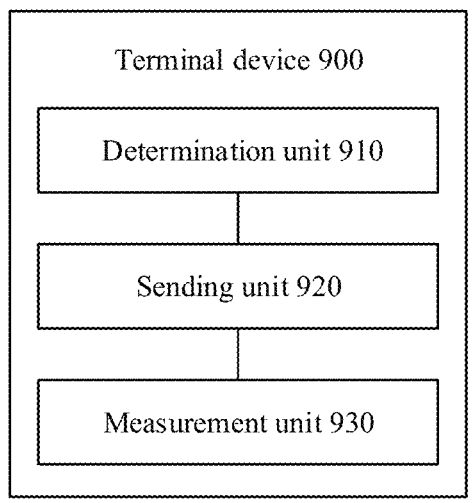
FIG. 10 is another schematic block diagram of a terminal device according to an embodiment of the disclosure.

FIG. 10 is a schematic block diagram of a terminal device 900 according to an embodiment of the disclosure. As illustrated in FIG. 10, the terminal device 900 includes a determination unit 910, a sending unit 920 and a measurement unit 930.

The determination unit 910 is configured to determine a target measurement gap mode in multiple measurement gap modes.

The sending unit 920 is configured to send to a network device indication information used for indicating the target measurement gap mode.

The measurement unit 930 is configured to perform inter-frequency/inter-system measurement according to the target measurement gap mode.

Therefore, the terminal device of the embodiment of the disclosure selects a suitable measurement gap mode for inter-frequency/inter-system measurement from the multiple measurement gap modes, which is favorable for reducing a network overhead.

In at least one embodiment of the disclosure, the determination unit is specifically configured to determine the target measurement gap mode in the multiple measurement gap modes according to at least one of the following information: movement speed information of the terminal device, QoS information of a present service of the terminal device, QoS information of a detected service of the terminal device or present channel quality information of the terminal device.

In at least one embodiment of the disclosure, the determination unit is specifically configured to: if a movement speed of the terminal device is greater than or equal to a first threshold, determine a first measurement gap mode in the multiple measurement gap modes as the target measurement gap mode; and if the movement speed of the terminal device is less than the first threshold, determine a second measurement gap mode in the multiple measurement gap modes as the target measurement gap mode. A gap period of the first measurement gap mode is less than a gap period of the second measurement gap mode.

In at least one embodiment of the disclosure, the determination unit is specifically configured to: if a service delay requirement in the QoS information of the present service is greater than or equal to a second threshold, determine a third measurement gap mode in the multiple measurement gap modes as the target measurement gap mode; and if the service delay requirement in the QoS information of the present service is less than the second threshold, determine a fourth measurement gap mode in the multiple measurement gap modes as the target measurement gap mode. A gap period of the third measurement gap mode is greater than a gap period of the fourth measurement gap mode.

In the embodiment of the disclosure, the determination unit is specifically configured to: if a data rate requirement in the QoS information of the present service is greater than or equal to a third threshold, determine a fifth measurement gap mode in the multiple measurement gap modes as the target measurement gap mode; and if the data rate requirement in the QoS information of the present service is less than the third threshold, determine a sixth measurement gap mode in the multiple measurement gap modes as the target measurement gap mode. A gap period of the fifth measurement gap mode is less than a gap period of the sixth measurement gap mode.

In the embodiment of the disclosure, the determination unit is specifically configured to: if a service delay in the QoS information of the detected service is greater than or equal to a fourth threshold, determine a seventh measurement gap mode in the multiple measurement gap modes as the target measurement gap mode; and if the service delay in the QoS information of the detected service is less than the fourth threshold, determine an eighth measurement gap mode in the multiple measurement gap modes as the target measurement gap mode. A gap period of the seventh measurement gap mode is greater than a gap period of the eighth measurement gap mode.

In the embodiment of the disclosure, the determination unit is specifically configured to: if a data rate in the QoS information of the detected service is greater than or equal to a fifth threshold, determine a ninth measurement gap mode in the multiple measurement gap modes as the target measurement gap mode; and if the data rate in the QoS information of the detected service is less than the fifth threshold, determine a tenth measurement gap mode in the multiple measurement gap modes as the target measurement gap mode. A gap period of the ninth measurement gap mode is less than a gap period of the tenth measurement gap mode.

In at least one embodiment of the disclosure, the determination unit is specifically configured to: if present channel quality of the terminal device is greater than or equal to a sixth threshold, determine an eleventh measurement gap mode in the multiple measurement gap modes as the target measurement gap mode; and if the present channel quality of the terminal device is less than the sixth threshold, determine a twelfth measurement gap mode in the multiple measurement gap modes as the target measurement gap mode. A gap period of the eleventh measurement gap mode is less than a gap period of the twelfth measurement gap mode.

In at least one the embodiment of the disclosure, the multiple measurement gap modes are predetermined according to pre-configured by the network device or predetermined.

It is to be understood that the terminal device 900 according to the embodiment of the disclosure may correspond to the terminal device in the method embodiment of the disclosure, and the abovementioned and other operations and/or functions of each unit in the terminal device 900 are adopted to implement the corresponding flows executed by the terminal device in the method in FIG. 6 respectively and will not be elaborated herein for simplicity.

Figure 11:
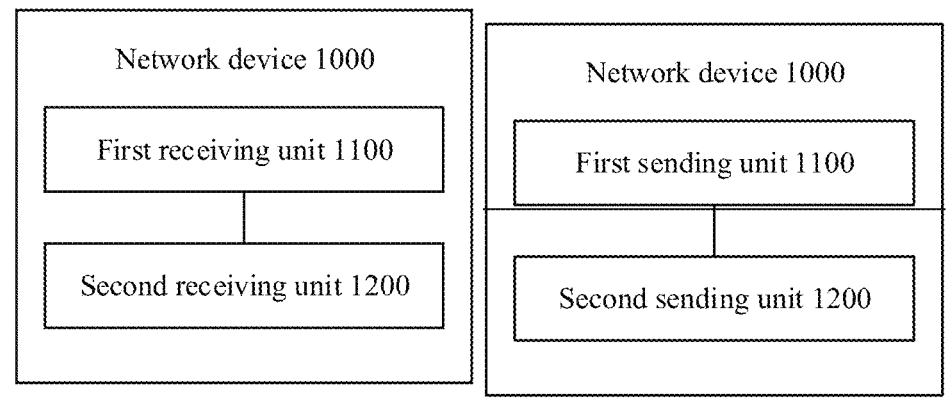
FIG. 11 is another schematic block diagram of a network device according to an embodiment of the disclosure.

FIG. 11 is a schematic block diagram of a network device 1000 according to an embodiment of the disclosure. As illustrated in FIG. 11, the network device 1000 includes a first receiving unit 1100 and a second receiving unit 1200.

The first receiving unit 1100 is configured to receive indication information used for indicating a target measurement gap mode from a terminal device.

The second receiving unit 1200 is configured to receive a measurement result of inter-frequency/inter-system measurement executed by the terminal device according to the target measurement gap mode.

It is to be understood that the network device 1000 according to the embodiment of the disclosure may correspond to the network device in the method embodiment of the disclosure and the abovementioned and other operations and/or functions of each unit in the network device 1000 are adopted to implement the corresponding flows executed by the network device in the method in FIG. 7 respectively and will not be elaborated herein for simplicity.

Figure 12:
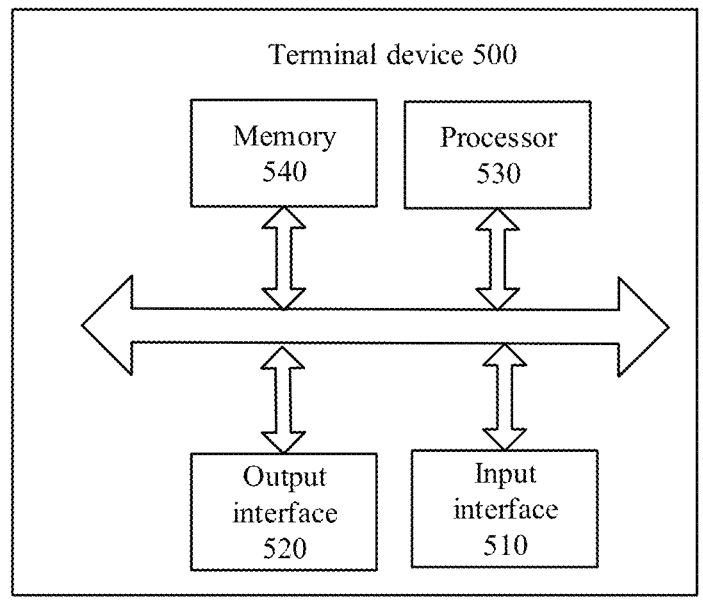
FIG. 12 is yet another schematic block diagram of a terminal device according to an embodiment of the disclosure.

As illustrated in FIG. 12, an embodiment of the disclosure also provides a terminal device 500. The terminal device 500 may be the terminal device 300 in FIG. 8, and may be configured to execute corresponding operations of the terminal device in each method in FIG. 4 and FIG. 5. The terminal device 500 includes an input interface 510, an output interface 520, a processor 530 and a memory 540. The input interface 510, the output interface 520, the processor 530 and the memory 540 may be connected through a bus system. The memory 540 is configured to store a program, an instruction or a code. The processor 530 is configured to execute the program, instruction or code in the memory 540 to control the input interface 510 to receive a signal, control the output interface 520 to send a signal and complete operations in the foregoing method embodiments.

In this way, the terminal device of the embodiment of the disclosure reports to a network device some auxiliary information used for determining a target measurement gap mode, so that the network device configures the measurement gap mode for the terminal device in combination with the auxiliary information, and thus performance of the terminal device may be matched with the measurement gap mode better, thereby improving system performance.

It is to be understood that, in the embodiment of the disclosure, the processor 530 may be a Central Processing Unit (CPU) and the processor 530 may also be another universal processor, a Digital Signal Processor (DSP), an Application Specific Integrated Circuit (ASIC), a Field Programmable Gate Array (FPGA) or another programmable logic device, discrete gate or transistor logic device and discrete hardware component and the like. The universal processor may be a microprocessor or the processor may also be any conventional processor and the like.

The memory 540 may include a Read-Only Memory (ROM) and a Random Access Memory (RAM) and provides an instruction and data for the processor 530. A part of the memory 540 may further include a non-volatile RAM. For example, the memory 540 may further store information of a device type.

In an implementation process, each operations of the method may be completed by an integrated logic circuit of hardware in the processor 530 or an instruction in software. The operations of the method disclosed in combination with the embodiments of the disclosure may be directly embodied to be executed and completed by a hardware processor or by a combination of hardware and software modules in the processor. The software module may be located in a mature storage medium in this field such as a RAM, a flash memory, a ROM, a programmable ROM or electrically erasable programmable ROM and a register. The storage medium is located in the memory 540. The processor 530 reads information in the memory 540 and completes the operations of the method in combination with hardware. No more detailed descriptions will be made herein to avoid repetitions.

In a specific implementation mode, the measurement unit 330 and determination unit 340 of the terminal device 300 may be implemented by the processor 530 in FIG. 12, the sending unit 310 of the terminal device 300 may be implemented by the output interface 520 in FIG. 12, and the receiving unit 320 of the terminal device 300 may be implemented by the input interface 510 in FIG. 12.

Figure 13:
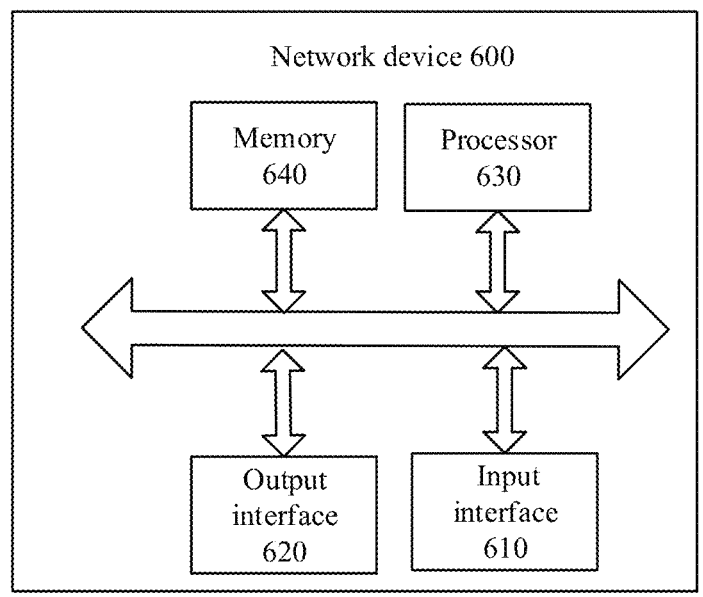
FIG. 13 is yet another schematic block diagram of a network device according to an embodiment of the disclosure.

As illustrated in FIG. 13, an embodiment of the disclosure also provides a network device 600. The network device 600 may be the network device 400 in FIG. 9, and may be configured to execute corresponding operations of the network device in each method in FIG. 4 and FIG. 5. The network device 600 includes an input interface 610, an output interface 620, a processor 630 and a memory 640. The input interface 610, the output interface 620, the processor 630 and the memory 640 may be connected through a bus system. The memory 640 is configured to store a program, an instruction or a code. The processor 630 is configured to execute the program instruction or code in the memory 640 to control the input interface 610 to receive a signal, control the output interface 620 to send a signal and complete operations in the method embodiments.

Therefore, the network device of the embodiment of the disclosure configures a measurement gap mode for a terminal device in combination with some auxiliary information reported by the terminal device to determine a target measurement gap mode, so that performance of the terminal device may be matched with the measurement gap mode better, thereby improving system performance.

It is to be understood that, in the embodiment of the disclosure, the processor 630 may be a CPU and the processor 630 may also be another universal processor, a DSP, an ASIC, an FPGA or another programmable logic device, discrete gate or transistor logic device and discrete hardware component and the like. The universal processor may be a microprocessor or the processor may also be any conventional processor and the like.

The memory 640 may include a ROM and a RAM and provides an instruction and data for the processor 630. A part of the memory 640 may further include a non-volatile RAM. For example, the memory 640 may further store information of a device type.

In an implementation process, various operations of the method may be completed by an integrated logic circuit of hardware in the processor 630 or an instruction in software. The operations of the method disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a programmable ROM or electrically erasable programmable ROM and a register. The storage medium is located in the memory 640. The processor 630 reads information in the memory 640 and completes the operations of the method in combination with hardware. No more detailed descriptions will be made herein to avoid repetitions.

In a specific implementation mode, the sending unit 430 in the network device 400 may be implemented by the output interface 620 in FIG. 13, the receiving unit 410 in the network device 400 may be implemented by the input interface 610 in FIG. 13 and the determination unit 420 in the network device 400 may be implemented by the processor 630 in FIG. 13.

Figure 14:
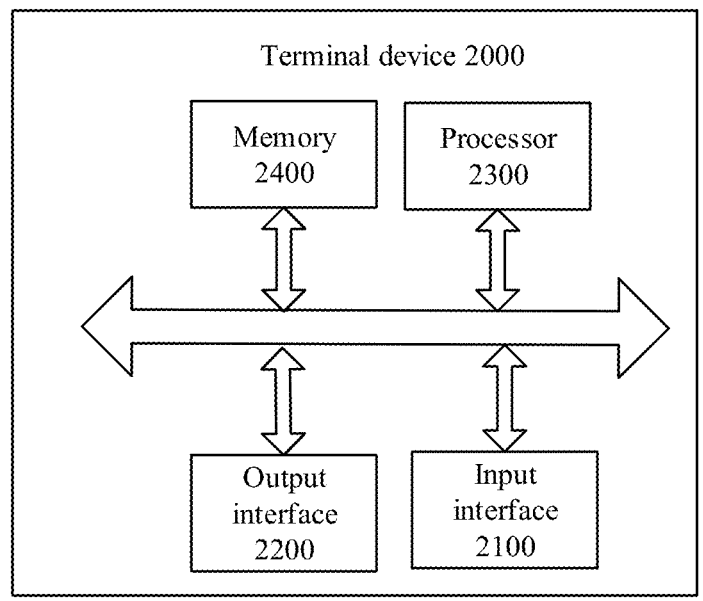
FIG. 14 is still another schematic block diagram of a terminal device according to an embodiment of the disclosure.

As illustrated in FIG. 14, an embodiment of the disclosure also provides a terminal device 2000. The terminal device 2000 may be the terminal device 900 in FIG. 10, and may be configured to execute corresponding operations of the terminal device in the method in FIG. 6. The terminal device 2000 includes an input interface 2100, an output interface 2200, a processor 2300 and a memory 2400. The input interface 2100, the output interface 2200, the processor 2300 and the memory 2400 may be connected through a bus system. The memory 2400 is configured to store a program, an instruction or a code. The processor 2300 is configured to execute the program instruction or code in the memory 2400 to control the input interface 2100 to receive a signal, control the output interface 2200 to send a signal and complete operations in the method embodiments.

Therefore, the terminal device of the embodiment of the disclosure selects a suitable measurement gap mode for inter-frequency/inter-system measurement from multiple measurement gap modes, thereby facilitating for reducing a network overhead.

It is to be understood that, in the embodiment of the disclosure, the processor 2300 may be a CPU and the processor 2300 may also be another universal processor, a DSP, an ASIC, an FPGA or another programmable logic device, discrete gate or transistor logic device and discrete hardware component and the like. The universal processor may be a microprocessor or the processor may also be any conventional processor and the like.

The memory 2400 may include a ROM and a RAM and provides an instruction and data for the processor 2300. A part of the memory 2400 may further include a nonvolatile RAM. For example, the memory 2400 may further store information of a device type.

In an implementation process, each operation of the method may be completed by an integrated logic circuit of hardware in the processor 2300 or an instruction in software. The operations of the method disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a programmable ROM or electrically erasable programmable ROM and a register. The storage medium is located in the memory 2400. The processor 2300 reads information in the memory 2400 and completes the contents of the method in combination with hardware. No more detailed descriptions will be made herein to avoid repetitions.

In a specific implementation mode, the determination unit 910 in the terminal device 900 may be implemented by the processor 2300 in FIG. 14 and the sending unit 920 in the terminal device 900 may be implemented by the output interface 2200 in FIG. 14.

Figure 15:
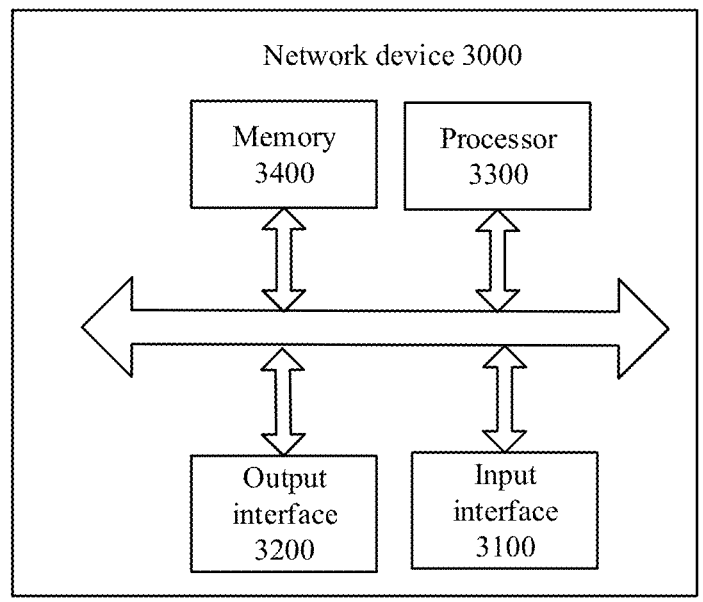
FIG. 15 is still another schematic block diagram of a network device according to an embodiment of the disclosure.

As illustrated in FIG. 15, an embodiment of the disclosure also provides a network device 3000. The network device 3000 may be the network device 1000 in FIG. 11, and may be configured to execute corresponding operations of the network device in the method in FIG. 7. The network device 3000 includes an input interface 3100, an output interface 3200, a processor 3300 and a memory 3400. The input interface 3100, the output interface 3200, the processor 3300 and the memory 3400 may be connected through a bus system. The memory 3400 is configured to store a program, an instruction or a code. The processor 3300 is configured to execute the program instruction or code in the memory 3400 to control the input interface 3100 to receive a signal, control the output interface 3200 to send a signal and complete operations in the method embodiments.

Therefore, according to the network device of the embodiment of the disclosure, a terminal device selects a suitable measurement gap mode for inter-frequency/inter-system measurement from multiple measurement gap modes, which is favorable for reducing a network overhead.

It is to be understood that, in the embodiment of the disclosure, the processor 3300 may be a CPU and the processor 3300 may also be another universal processor, a DSP, an ASIC, an FPGA or another programmable logic device, discrete gate or transistor logic device and discrete hardware component and the like. The universal processor may be a microprocessor or the processor may also be any conventional processor and the like.

The memory 3400 may include a ROM and a RAM and provides an instruction and data for the processor 3300. A part of the memory 3400 may further include a non-volatile RAM. For example, the memory 3400 may further store information of a device type.

In an implementation process, various operations of the method may be completed by an integrated logic circuit of hardware in the processor 3300 or an instruction in software. The contents of the method disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a programmable ROM or electrically erasable programmable ROM and a register. The storage medium is located in the memory 3400. The processor 3300 reads information in the memory 3400 and completes the contents of the method in combination with hardware. No more detailed descriptions will be made herein to avoid repetitions.

In a specific implementation mode, the first receiving unit 1100 and second receiving unit 1200 in the network device 1000 may be implemented by the output interface 3200 in FIG. 15.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or greater than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of each embodiment of the disclosure. The storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

What is claimed is:

1. An inter-frequency/inter-system measurement method, comprising:
    determining, by a terminal device, a desired measurement gap mode in multiple measurement gap modes,
    sending, by the terminal device to a network device, auxiliary information used for determining a target measurement gap mode;
    receiving, by the terminal device, indication information sent by the network device, the indication information being used for indicating the target measurement gap mode; and
    performing, by the terminal device, inter-frequency/inter-system measurement according to the target measurement gap mode,
    wherein the auxiliary information comprises at least one of: movement speed information of the terminal device, Quality of Service (QoS) information of a present service of the terminal device, QoS information of a detected service of the terminal device or present channel quality information of the terminal device, and
    the determining, by the terminal device, the desired measurement gap mode in the multiple measurement gap modes comprises at least one of the following operations:
    i) determining a first measurement gap mode in the multiple measurement gap modes as the desired measurement gap mode when the movement speed of the terminal device is greater than or equal to a first threshold; and determining a second measurement gap mode in the multiple measurement gap modes as the desired measurement gap mode when the movement speed of the terminal device is less than the first threshold;
    ii) determining a third measurement gap mode in the multiple measurement gap modes as the desired measurement gap mode when a service delay requirement in the QoS information of the present service is greater than or equal to a second threshold; and determining a fourth measurement gap mode in the multiple measurement gap modes as the desired measurement gap mode when the service delay requirement in the QoS information of the present service is less than the second threshold;
    iii) determining a fifth measurement gap mode in the multiple measurement gap modes as the desired measurement gap mode when a data rate requirement in the QoS information of the present service is greater than or equal to a third threshold; and determining a sixth measurement gap mode in the multiple measurement gap modes as the desired measurement gap mode when the data rate requirement in the QoS information of the present service is less than the third threshold;
    iv) determining a seventh measurement gap mode in the multiple measurement gap modes as the desired measurement gap mode when a service delay in the QoS information of the detected service is greater than or equal to a fourth threshold, and determining an eighth measurement gap mode in the multiple measurement gap modes as the desired measurement gap mode when the service delay in the QoS information of the detected service is less than the fourth threshold;
    v) determining a ninth measurement gap mode in the multiple measurement gap modes as the desired measurement gap mode when a data rate in the QoS information of the detected service is greater than or equal to a fifth threshold; and determining a tenth measurement gap mode in the multiple measurement gap modes as the desired measurement gap mode when the data rate in the QoS information of the detected service is less than the fifth threshold; or
    vi) determining an eleventh measurement gap mode in the multiple measurement gap modes as the desired measurement gap mode when a present channel quality of the terminal device is less than a sixth threshold; and determining a twelfth measurement gap mode in the multiple measurement gap modes as the desired measurement gap mode when the present channel quality of the terminal device is greater than or equal to the sixth threshold.

2. The method of claim 1, wherein the auxiliary information is the desired measurement gap mode of the terminal device or an increment value of a gap period of the desired measurement gap mode of the terminal device with respect to a gap period of a measurement gap mode previously configured by the network device.

3. The method of claim 1, wherein a gap period of the third measurement gap mode is greater than a gap period of the fourth measurement gap mode.

4. The method of claim 1, wherein a gap period of the fifth measurement gap mode is less than a gap period of the sixth measurement gap mode.

5. The method of claim 1, wherein a gap period of the seventh measurement gap mode is greater than a gap period of the eighth measurement gap mode.

6. The method of claim 1, wherein-a gap period of the ninth measurement gap mode is less than a gap period of the tenth measurement gap mode.

7. The method of claim 1, wherein a gap period of the eleventh measurement gap mode is less than a gap period of the twelfth measurement gap mode.

8. A terminal device, comprising:
    a processor, an input interface and an output interface, wherein the processor, the input interface and the output interface are connected through a system bus,
    the processor is configured to determine a desired measurement gap mode in multiple measurement gap modes;
    the output interface is configured to send to a network device auxiliary information used for determining a target measurement gap mode;
    the input interface is configured to receive indication information sent by the network device, the indication information being used for indicating the target measurement gap mode; and
    the processor is further configured to perform inter-frequency/inter-system measurement according to the target measurement gap mode,
    wherein the auxiliary information comprises at least one of: movement speed information of the terminal device, Quality of Service (QoS) information of a present service of the terminal device, QoS information of a detected service of the terminal device or present channel quality information of the terminal device, and
    the processor is specifically configured to perform at least one of the following:
    i) determining a first measurement gap mode in the multiple measurement gap modes as the desired measurement gap mode when the movement speed of the terminal device is greater than or equal to a first threshold; and determining a second measurement gap mode in the multiple measurement gap modes as the desired measurement gap mode when the movement speed of the terminal device is less than the first threshold;

ii) determining a third measurement gap mode in the multiple measurement gap modes as the desired measurement gap mode when a service delay requirement in the QoS information of the present service is greater than or equal to a second threshold; and determining a fourth measurement gap mode in the multiple measurement gap modes as the desired measurement gap mode when the service delay requirement in the QoS information of the present service is less than the second threshold;

iii) determining a fifth measurement gap mode in the multiple measurement gap modes as the desired measurement gap mode when a data rate requirement in the QoS information of the present service is greater than or equal to a third threshold; and determining a sixth measurement gap mode in the multiple measurement gap modes as the desired measurement gap mode when the data rate requirement in the QoS information of the present service is less than the third threshold;

iv) determining a seventh measurement gap mode in the multiple measurement gap modes as the desired measurement gap mode when a service delay in the QoS information of the detected service is greater than or equal to a fourth threshold; and determining an eighth measurement gap mode in the multiple measurement gap modes as the desired measurement gap mode when the service delay in the QoS information of the detected service is less than the fourth threshold;

v) determining a ninth measurement gap mode in the multiple measurement gap modes as the desired measurement gap mode when a data rate in the QoS information of the detected service is greater than or equal to a fifth threshold; and determining a tenth measurement gap mode in the multiple measurement gap modes as the desired measurement gap mode when the data rate in the QoS information of the detected service is less than the fifth threshold; or vi) determining an eleventh measurement gap mode in the multiple measurement gap modes as the desired measurement gap mode when a present channel quality of the terminal device is less than a sixth threshold; and determining a twelfth measurement gap mode in the multiple measurement gap modes as the desired measurement gap mode when the present channel quality of the terminal device is greater than or equal to the sixth threshold.

9. The terminal device of claim 8, wherein the auxiliary information is a desired measurement gap mode of the terminal device or an increment value of a gap period of the desired measurement gap mode of the terminal device with respect to a gap period of a measurement gap mode previously configured by the network device.

10. The terminal device of claim 8, wherein, a gap period of the third measurement gap mode is greater than a gap period of the fourth measurement gap mode.

11. The terminal device of claim 8, wherein a gap period of the fifth measurement gap mode is less than a gap period of the sixth measurement gap mode.

12. The terminal device of claim 8, wherein a gap period of the seventh measurement gap mode is greater than a gap period of the eighth measurement gap mode.

13. The terminal device of claim 8, wherein a gap period of the ninth measurement gap mode is less than a gap period of the tenth measurement gap mode.

14. The terminal device of claim 8, wherein a gap period of the eleventh measurement gap mode is less than a gap period of the twelfth measurement gap mode.

15. The terminal device of claim 9, wherein the multiple measurement gap modes are pre-configured by the network device or predetermined.

16. The terminal device of claim 8, wherein the input interface is configured to: receive the indication information through Radio Resource Control (RRC) signaling.

17. A network device, comprising: a processor, an input interface and an output interface, wherein the processor, the input interface and the output interface are connected through a system bus, the input interface is configured to receive auxiliary information for a measurement gap from a terminal device;

the processor is configured to determine a target measurement gap mode for inter-frequency/inter-system measurement according to the auxiliary information; and the output interface is configured to send to the terminal device indication information used for indicating the target measurement gap mode, wherein the auxiliary information comprises at least one of: movement speed information of the terminal device, Quality of Service (QoS) information of a present service of the terminal device, QoS information of a detected service of the terminal device or present channel quality information of the terminal device, and the processor is specifically configured to perform at least one of the following operations:

i) determining a gap mode with a first gap period as the target measurement gap mode when a movement speed of the terminal device is greater than or equal to a first threshold, and determining a gap mode with a second gap period as the target measurement gap mode when the movement speed of the terminal device is less than the first threshold;

ii) determining a gap mode with a third gap period as the target measurement gap mode when a service delay requirement in the QoS information of the present service is greater than or equal to a second threshold, and determining a gap mode with a fourth gap period as the target measurement gap mode when the service delay requirement in the QoS information of the present service is less than the second threshold;

iii) determining a gap mode with a fifth gap period as the target measurement gap mode when a data rate requirement in the QoS information of the present service is greater than or equal to a third threshold, and determining a gap mode with a sixth gap period as the target measurement gap mode when the data rate requirement in the QoS information of the present service is less than the third threshold;

iv) determining a gap mode with a seventh gap period as the target measurement gap mode when a service delay in the QoS information of the detected service is greater than or equal to a fourth threshold, and determining a gap mode with an eighth gap period as the target measurement gap mode when the service delay in the QoS information of the detected service is less than the fourth threshold;

v) determining a gap mode with a ninth period as the target measurement gap mode when a data rate in the QoS information of the detected service is greater than or equal to a fifth threshold; and determining a gap mode with a tenth gap period as the target measurement gap mode when the data rate in the QoS information of the detected service is less than the fifth threshold; or vi) determining a gap mode with an eleventh gap period as the target measurement gap mode when present channel quality of the terminal device is less than a sixth threshold, and determining a gap mode with a twelfth gap period as the target measurement gap mode when the present channel quality of the terminal device is greater than or equal to the sixth threshold.

18. The network device of claim 17, wherein the first gap period is less than the second gap period; the third gap period is greater than the fourth gap period; the fifth gap period is less than the sixth gap period; the seventh gap period is greater than the eighth gap period; the ninth gap period is greater than the tenth gap period; the eleventh gap period is less than the twelfth gap period.

19. The method of claim 1, wherein a gap period of the first measurement gap mode is less than a gap period of the second measurement gap mode.

20. The terminal device of claim 8, wherein a gap period of the first measurement gap mode is less than a gap period of the second measurement gap mode.

* * * * *